US012753776B2

(12) United States Patent
Rao et al.

(10) Patent No.: US 12,753,776 B2
(45) Date of Patent: Oct. 6, 2026

(54) INTEGRATED INFLATOR/DEFLATOR AIR PUMP, MOUNTING STRUCTURE AND INFLATABLE PRODUCT

(71) Applicant: Jiangsu Guorun Electric Co., Ltd., Huaian (CN)

(72) Inventors: Houxi Rao, Huaian (CN); Lei Chen, Huaian (CN); Jianbing Yin, Huaian (CN); Xia Zhong, Huaian (CN)

(73) Assignee: JIANGSU GUORUN ELECTRIC CO., LTD., Huaian (CN)

( * ) Notice: Subject to any disclaimer, the term of this patent is extended or adjusted under 35 U.S.C. 154(b) by 18 days.

(21) Appl. No.: 18/877,156

(22) PCT Filed: Apr. 23, 2023

(86) PCT No.: PCT/CN2023/090087
§ 371 (c)(1),
(2) Date: Dec. 19, 2024

(87) PCT Pub. No.: WO2024/207563
PCT Pub. Date: Oct. 10, 2024

(65) Prior Publication Data

US 2025/0376992 A1 Dec. 11, 2025

(30) Foreign Application Priority Data

Apr. 4, 2023 (CN) ......................... 202310351706.1
Apr. 4, 2023 (CN) ......................... 202320720710.6
Apr. 4, 2023 (CN) ......................... 202320721107.X

(51) Int. Cl.
*F04D 29/62* (2006.01)
*F04D 17/08* (2006.01)
(Continued)

(52) U.S. Cl.
CPC ........... *F04D 29/624* (2013.01); *F04D 17/08* (2013.01); *F04D 25/06* (2013.01); *F04D 29/4206* (2013.01); *F16K 24/00* (2013.01)

(58) Field of Classification Search
CPC ....................................................... F04D 25/06
See application file for complete search history.

(56) References Cited

U.S. PATENT DOCUMENTS

2016/0123349 A1 5/2016 Wang et al.
2020/0049156 A1 2/2020 Lau et al.
(Continued)

FOREIGN PATENT DOCUMENTS

CN 103790848 A 5/2014
CN 103967821 A 8/2014
(Continued)

OTHER PUBLICATIONS

Qin et al., 'Ventilation Structure of Electric Air Pump'—Mach. Trans. CN 212454905 (Year: 2021).*

*Primary Examiner* — Kenneth J Hansen
(74) *Attorney, Agent, or Firm* — MUNCY, GEISSLER, OLDS & LOWE, P.C.

(57) ABSTRACT

An integrated inflator/deflator air pump, a mounting structure and an inflatable product. The air pump includes a pump body. Function buttons are pressed to drive a linkage plate to move, such that a first microswitch in the pump body is triggered so as to start a blower assembly. The function buttons are pressed to drive a reversing block to move up and down, such that a blower air inlet or a blower air outlet of the blower assembly is in communication with a first air port of the pump body. The mounting structure includes a mounting seat, and the pump body is embedded in the mounting seat. By cooperation between a positioning groove and a positioning block, when the pump body is mounted in
(Continued)

the mounting seat, the first air port of the pump body can directly correspond to a third air port of the mounting seat.

20 Claims, 14 Drawing Sheets

(51) Int. Cl.

| | |
|---|---|
| ***F04D 25/06*** | (2006.01) |
| ***F04D 29/42*** | (2006.01) |
| *F16K 24/00* | (2006.01) |

(56) References Cited

U.S. PATENT DOCUMENTS

| | | | | |
|---|---|---|---|---|
| 2021/0003126 | A1 | 1/2021 | Huang et al. | |
| 2026/0009393 | A1 * | 1/2026 | Huang .................... | F04D 25/08 |

FOREIGN PATENT DOCUMENTS

| | | | | |
|---|---|---|---|---|
| CN | 106989037 | A | | 7/2017 |
| CN | 111852921 | A | | 10/2020 |
| CN | 212360110 | U | | 1/2021 |
| CN | 212454905 | U | * | 2/2021 |

* cited by examiner

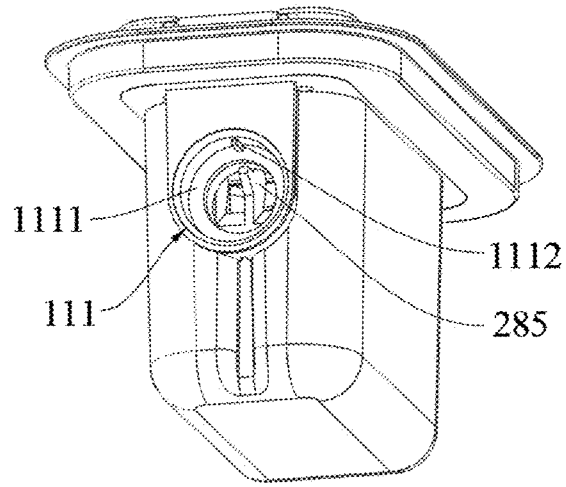
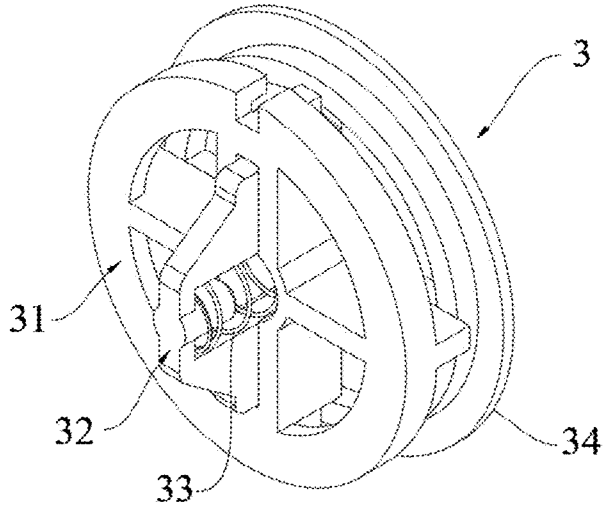
FIG. 20
FIG. 21
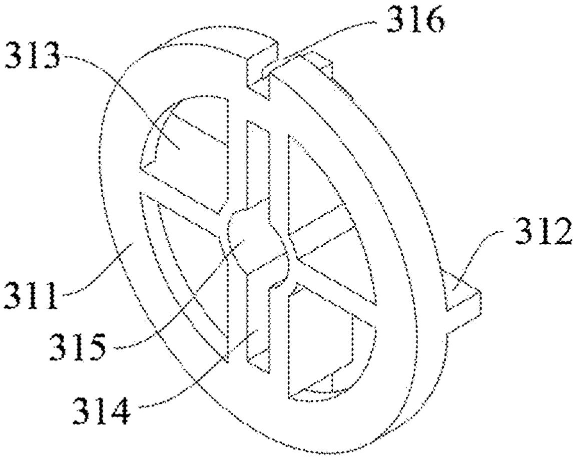
FIG. 22
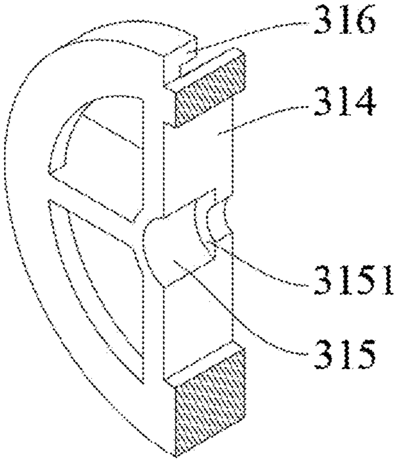
FIG. 23

INTEGRATED INFLATOR/DEFLATOR AIR PUMP, MOUNTING STRUCTURE AND INFLATABLE PRODUCT

FIELD OF TECHNOLOGY

The invention relates to the field of air pumps, and in particular to an integrated inflator/deflator air pump, a mounting structure and an inflatable product.

BACKGROUND

At present, inflatable products are more and more widely used, such as inflatable airbeds, inflatable pools and inflatable cushions. All these inflatable products need to be inflated for use and deflated for folding and storage. In terms of inflation, the inflatable product is usually inflated using a hand air pump or an electric inflator air pump, and during the inflation process, the air pump is butted with the inflatable product. In terms of deflation, the inflatable product is usually naturally deflated by opening the air valve of the inflatable product.

An air pump is a device for discharging air from a closed space or adding air to a closed space, and an electric air pump continuously compresses air by means of electricity to generate air pressure. The existing air pumps may have both inflation and deflation functions, but they are complicated in structure.

With the continuous upgrading of air pump products, how to design an integrated inflator/deflator air pump that is simple to operate and reasonable in movement has become an urgent problem to be solved.

SUMMARY

In order to solve the above technical problem, the invention provides an integrated inflator/deflator air pump, a mounting structure and an inflatable product. The cooperation between a linkage plate and a microswitch is utilized to realize the control of a blower assembly. Function buttons drive the linkage plate and a reversing block, thereby realizing switching between inflation and deflation. The integrated inflator/deflator air pump is compact in overall structure, simple to operation and reasonable in design. In the mounting structure, a mounting seat is combined with the inflatable product, and a pump body is embedded in the mounting seat, so that the pump body is more convenient to use. Moreover, the embedment structure between the pump body and the mounting seat ensures the mounting stability of the pump body in the mounting seat and the airtightness of the air passage. The inflatable product is simple to operate and convenient to use.

The technical solution adopted by the invention to solve the technical problem is as follows: An integrated air pump for inflation and deflation includes a pump body. The pump body includes a pump casing, a first air port located at a front side of the pump casing, and function buttons arranged at a top side of the pump casing. A linkage plate movable forward and rearward is further arranged in the pump casing. A circuit board is further arranged in the pump casing, and the circuit board is provided with a first microswitch triggerable by the linkage plate. A blower assembly is further arranged in the pump casing. The blower assembly is configured to start when the first microswitch is triggered. The blower assembly has a blower air inlet and a blower air outlet, and both the blower air inlet and the blower air outlet are arranged at a front end surface of the blower assembly. A reversing block movable up and down is further arranged between the front end surface of the blower assembly and the first air port. A reversing flow channel is arranged in the reversing block. The reversing block is configured to switch the reversing flow channel between the blower air inlet and the blower air outlet of the blower assembly, such that the blower air inlet of the blower assembly is in communication with the first air port to provide a deflation function or the blower air outlet of the blower assembly is in communication with the first air port to provide an inflation function.

Further, the linkage plate is provided with a trigger portion. The first microswitch is arranged on a side surface of the linkage plate, and a contact of the first microswitch correspondingly cooperates with the trigger portion, such that when the linkage plate moves rearward, the first microswitch is triggered by the trigger portion so as to start the blower assembly. Linkage plate return springs are further arranged between a rear end of the linkage plate and an inner wall of the pump casing, and the linkage plate return springs are configured to provide a force for the linkage plate to return forward. The first microswitch is further configured to terminate a triggered state when the linkage plate moves forward to its initial position, so as to stop the blower assembly.

Further, the top side of the pump casing is provided with button grooves. The function buttons include an inflation button, a deflation button and a stop button, and are mounted in the corresponding button grooves. The function buttons each include a button cap, a button rod arranged at a lower side of the button cap, and a button return spring located at an outer side of the button rod and between the button cap and the button groove. A bottom side of the button groove is further provided with a first via hole. The linkage plate is arranged below the button grooves. The function button is configured to cooperate with the linkage plate after the button rod runs through the corresponding first via hole so as to convert a pressing force received by the function button into power for the linkage plate to move rearward.

Further, the linkage plate is provided with second via holes for the button rods of the function buttons to run through. A top side of a rear end of each of the second via holes is provided with a first slope. A side of the button rod corresponding to the first slope is provided with a second slope, such that when the function button is pressed to move downward, the linkage plate moves rearward by cooperation between the second slope and the first slope.

Further, the button rods of the inflation button and the deflation button are provided with button clamping grooves near top sides. Each of the button clamping grooves cooperates with a rear end of the second via hole, such that when the inflation button or the deflation button is pressed to move downward until the button clamping groove is located at the second via hole, the linkage plate moves forward under the action of the linkage plate return springs, and the rear end of second via hole abuts against the button clamping groove, so that the inflation button or the deflation button is stuck and remains in the pressed state and the linkage plate remains in the state of triggering the first microswitch.

Further, the stop button does not have a button clamping groove, and a distance by which the stop button drives the linkage plate to move rearward is greater than a distance by which the inflation button and/or the deflation button drives the linkage plate to move rearward, such that when the stop button is pressed, the linkage plate moves rearward and then is disengaged from the button clamping groove of the inflation button or the deflation button, and thereby the inflation button or the deflation button returns to its initial position under the action of the button return spring. The stop button is further configured to return to its initial position under the action of the button return spring after being released, and be out of contact with the linkage plate, such that the linkage plate returns to its initial position under the action of the linkage plate return springs.

Further, the bottom sides of the button grooves are further provided with positioning blocks. Each of the positioning blocks is provided with a guide groove in a front-rear direction. The linkage plate is further provided with third via holes. A rear end of each of the third via holes is provided with a slider portion protruding forward. The positioning block runs through the third via hole, and the slider portion is slidably arranged in the guide groove so as to provide a guide function for the linkage plate to move forward and rearward.

Further, the blower assembly includes a blower casing, an impeller mounted in the blower casing, and a blower motor mounted at a bottom side of the blower casing. A power output shaft of the blower motor is mounted with the impeller. The blower casing further has a blower flow channel therein, and the blower flow channel forms the blower air inlet at a lower side of a front end surface of the blower casing and forms the blower air outlet at an upper side of the front end surface of the blower casing. The blower air inlet and the blower air outlet are located in a same plane, such that when the reversing block moves up and down, the reversing flow channel in the reversing block is butted with the blower air inlet or the blower air outlet.

Further, the reversing block includes a reversing block body, and the reversing flow channel of the reversing block body has a large front opening and a small rear opening. The rear opening of the reversing flow channel is the same size as the blower air inlet and the blower air outlet. The front opening of the reversing flow channel keeps corresponding to the first air port in upward and downward strokes of the reversing block. A top side of the reversing block body is further provided with a press platform configured to cooperate with the button rod of the deflation button, such that the reversing block moves downward when receiving a pressing force of the deflation button, thereby realizing switching from inflation to deflation. A reversing block return spring is further arranged between a bottom side of the reversing block and a bottom side of the pump casing, such that the reversing block returns to its initial position when losing the pressing force of the deflation button, thereby realizing switching from deflation to inflation.

Further, a power board is further arranged in the pump casing, the power board is connected with a power cord, and an upper position of the pump casing is further provided with a power cord via hole for the power cord to run through.

Further, the pump casing is further provided with a handle. The handle is hinged with the pump casing.

A mounting structure for the integrated inflator/deflator air pump includes a mounting seat combined with an inflatable product. The pump body is embedded in the mounting seat. The mounting seat includes a seat body. The seat body is provided with a pump body accommodating cavity for accommodating the pump body. A front end of the seat body is provided with a third air port. An inner side of the seat body is further provided with a positioning block below the third air port. A bottom side of a first air port of the pump body is provided with a positioning groove. The positioning groove cooperates with the positioning block, such that when the pump body is mounted in the mounting seat, the first air port of the pump body directly corresponds to the third air port by using the positioning groove and the positioning block.

Further, a front end surface of the first air port of the pump body is provided with a sealing ring. A rear wall of the pump body accommodating cavity of the mounting seat is provided with rib portions. The rib portions are configured to provide a limit for pressing the sealing ring of the first air port against an inner wall of the pump body accommodating cavity of the seat body when the pump body is mounted into the mounting seat.

Further, the first air port of the pump body protrudes from a front end surface of a pump casing such that a space for air circulation is left between a front side of the pump body and the mounting seat. The rib portions are also configured such that a space for air circulation is left between a rear side of the pump body and the mounting seat. A bottom side of the pump body accommodating cavity of the mounting seat is provided with a first supporting block protruding from a bottom surface of the pump body accommodating cavity. A bottom side of the pump casing is provided with a second supporting block. The first supporting block cooperates with the second supporting block such that a space for air circulation is left between the bottom side of the pump body and the mounting seat.

Further, left and right sides of the pump body accommodating cavity of the mounting seat are provided with clamping grooves. Left and right sides of the pump casing are provided with clamping protrusions corresponding to the clamping grooves, and the clamping protrusions cooperate with the clamping grooves such that the pump body is embedded in the mounting seat.

Further, the mounting seat further includes a lid. One end of the lid is hinged with the mounting seat, and the other end is connected to the mounting seat through a snap-fit assembly.

Further, a top side of the pump casing is further provided with a switch hole. A circuit board of the pump body is further connected with a second microswitch. A contact of the second microswitch corresponds to the switch hole. An inner side of the lid is provided with a convex column. The second microswitch is configured to be triggered by the convex column running through the switch hole when the lid is flipped over to cover the mounting seat so as to make the pump body stop working.

Further, a front end of the reversing block is further provided with a shifting portion. The third air port of the mounting seat is further provided with a one-way valve. The blower assembly is configured to allow air to pass through a blower air outlet and a reversing flow channel, push up the one-way valve and enter the inflatable product when the reversing flow channel of the reversing block is butted with the blower air outlet, so as to inflate the inflatable product. The blower assembly is further configured to allow the air to enter a blower air inlet from the inflatable product against the one-way valve when the reversing flow channel of the reversing block is butted with the blower air inlet and after the shifting portion of the reversing block pushes up the one-way valve, so as to deflate the inflatable product.

Further, the seat body is further provided with a power cord accommodating cavity therein configured to store a power cord of the pump body.

Further, a partition is arranged between the power cord accommodating cavity and the pump body accommodating cavity, and a height of the partition is less than that of a power cord via hole of the pump body. The rib portions are arranged at a front side of the partition.

Further, a front end of the third air port is provided with a mounting cavity. The one-way valve includes a valve seat mounted in the mounting cavity, a valve spool mounted at the valve seat, and a valve plate located at a front end of the valve spool. The valve spool has a freedom to move forward and rearward along the valve seat. The valve plate is configured to move forward and rearward under the control of air pressures on two sides of the third air port, so as to cooperate with an inner wall of the third air port to open or close the third air port. A rear end of the valve spool protrudes from a rear side of the valve seat, the rear end of the valve spool is further provided with a guide portion configured to convert downward power of the shifting portion into power for the valve spool to move forward such that the valve plate is pushed away from the inner wall of the third air port to open the third air port. A valve spool return spring is further arranged between the valve seat and the valve spool. The valve spool return spring is configured to allow the valve spool to return to its initial position such that the valve plate contacts the third air port to close the third air port.

Further, the valve seat includes a fixed disk. A periphery of the fixed disk is configured to be mounted and fixed to an inner wall of the mounting cavity. The valve spool includes a movable disk located in front of the fixed disk, and the fixed disk is provided with a gas channel. A space for a gas to pass through is left between the fixed disk and the movable disk.

Further, the fixed disk is further provided with a sliding groove. A rear end of the movable disk is provided with a slider portion. The slider portion runs rearward through the sliding groove, and a rear end of the slider portion is exposed from a rear end of the fixed disk. The guide portion is arranged at the rear end of the slider portion.

Further, the slider portion is provided with a first spring groove. The fixed disk is provided with a second spring groove corresponding to the first spring groove. A rear end of the valve spool return spring abuts against a rear end of the first spring groove, and a front end of the valve spool return spring abuts against a front end of the second spring groove.

Further, the second spring groove is a stepped hole. The front end of the valve spool return spring abuts against a step surface of the stepped hole.

Further, the rear end of the first spring groove is further provided with a convex column, and the rear end of the valve spool return spring is sleeved on the convex column.

Further, the rear end of the fixed disk is provided with a cushion portion, such that the space for the gas to pass through is formed between the fixed disk and the movable disk.

Further, a peripheral side of the fixed disk is further provided with a foolproof opening. The inner wall of the mounting cavity of the third air port is provided with a positioning portion. The foolproof opening cooperates with the positioning portion such that the fixed disk is directionally mounted in the mounting cavity.

Further, the guide portion is a first slope going down from front to rear. A front lower side of the shifting portion has a second slope going down from front to rear. The first slope cooperates with the second slope to convert downward power of the shifting portion into power for the valve spool to move forward.

An inflatable product includes the aforementioned mounting structure. A mounting seat is mounted and combined with the inflatable product. A pump body is mounted in the mounting seat, and a third air port of the mounting seat is in communication with an air cavity and an air passage of the inflatable product. The one-way valve controls the air passage to open or close.

The invention has the following advantages: According to the integrated inflator/deflator air pump of the invention, the cooperation between the linkage plate and the first microswitch is utilized to realize the control of the blower assembly. The inflation button drives the linkage plate to realize the inflation function, and the deflation button drives the linkage plate and the reversing block synchronously to realize switching from the inflation function to the deflation function. The stop button may be used to stop inflation or deflation. In the mounting structure, the mounting seat is combined with the inflatable product, and the pump body is embedded in the mounting seat, so that the pump body is more convenient to use. Moreover, the embedment structure between the pump body and the mounting seat ensures the mounting stability of the pump body in the mounting seat and the airtightness of the air passage. The inflatable product is combined with the pump body through the mounting structure, so that the inflatable product is simple to operate and convenient to use.

BRIEF DESCRIPTION OF THE DRAWINGS

FIG. 20 is a schematic three-dimensional view of the mounting structure with the air port cover and a one-way valve removed according to Embodiment II;

FIG. 21 is a schematic three-dimensional view of the one-way valve in the mounting structure according to Embodiment II;

FIG. 22 is a schematic three-dimensional view of a valve seat of the one-way valve in the mounting structure according to Embodiment II;

FIG. 23 is a schematic three-dimensional sectional view of the valve seat of the one-way valve in the mounting structure according to Embodiment II;

Figure 1:
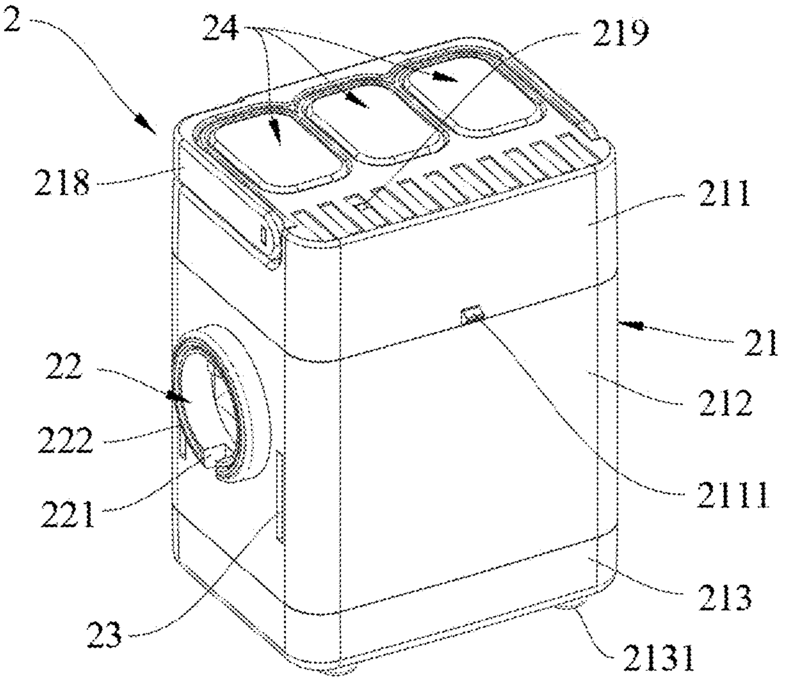
FIG. 1 is a schematic three-dimensional view of an integrated inflator/deflator air pump according to Embodiment I.

In the figures, 1—mounting seat, 2—pump body, 3—one—way valve;

11—seat body, 12—air port cover, 13—lid, 14—snap—fit assembly, 111—third air port, 112—positioning block, 113—clamping groove, 114—rib portion, 115—first supporting block, 116—pump body accommodating cavity, 117—power cord accommodating cavity, 118—partition, 1111—mounting cavity, 1112—positioning portion, 131—recess, 132—convex column, 141—snap—fit button, 142—snap—fit tongue;

21—pump casing, 22—first air port, 23—second air port, 24—function button, 25—linkage plate, 26—circuit board, 27—blower assembly, 28—reversing block, 29—power board, 211—upper casing, 212—middle casing, 213—lower casing, 214—button groove, 215—first via hole, 216—positioning block, 217—guide groove, 218—handle, 219—switch hole, 2111—clamping protrusion, 2112—power cord via hole, 2131—second supporting block, 221—positioning groove, 222—sealing ring, 241—inflation button, 242—deflation button, 243—stop button, 244—button cap, 245—button rod, 246—button clamping groove, 247—second slope, 248—button return spring, 251—linkage plate body, 252—trigger portion, 253—second via hole, 254—first slope, 255—linkage plate return spring, 256—third via hole, 257—slider portion, 261—first microswitch, 262—second microswitch, 271—blower casing, 272—impeller, 273—blower motor, 274—blower air inlet, 275—blower air outlet, 281—reversing block body, 282—reversing flow channel, 283—press platform, 284—reversing block return spring, 285—shifting portion;

31—valve seat, 32—valve spool, 33—valve spool return spring, 34—valve plate, 311—fixed disk, 312—cushion portion, 313—gas channel, 314—sliding groove, 315—second spring groove, 316—foolproof opening, 3151—step surface, 321—movable disk, 322—slider portion, 323—first spring groove, 324—convex column, 325—guide portion.

DESCRIPTION OF THE EMBODIMENTS

In order to better understand the invention, the invention will be further described in detail below with reference to the accompanying drawings and embodiments, and the embodiments are merely for explaining the invention, and are not intended to limit the protection scope of the invention.

Embodiment I

Referring to FIG. 1 to FIG. 15, this embodiment provides an integrated inflator/deflator air pump, including a pump body 2. The pump body 2 includes a pump casing 21, a first air port 22 located at a front side of the pump casing 21, and function buttons 24 arranged at a top side of the pump casing 21. A linkage plate 25 movable forward and rearward is further arranged in the pump casing 21. A circuit board 26 is further arranged in the pump casing 21, and the circuit board 26 is provided with a first microswitch 261 triggerable by the linkage plate 25. A blower assembly 27 is further arranged in the pump casing 21. The blower assembly 27 is configured to start when the first microswitch 261 is triggered. The blower assembly 27 has a blower air inlet 274 and a blower air outlet 275, and both the blower air inlet 274 and the blower air outlet 275 are arranged at a front end surface of the blower assembly 27. A reversing block 28 movable up and down is further arranged between the front end surface of the blower assembly 27 and the first air port 22. A reversing flow channel 282 is arranged in the reversing block 28. The reversing block 28 is configured to switch the reversing flow channel 282 between the blower air inlet 274 and the blower air outlet 275 of the blower assembly 27, such that the blower air inlet 274 of the blower assembly 27 is in communication with the first air port 22 to provide a deflation function or the blower air outlet 275 of the blower assembly 27 is in communication with the first air port 22 to provide an inflation function.

Figure 2:
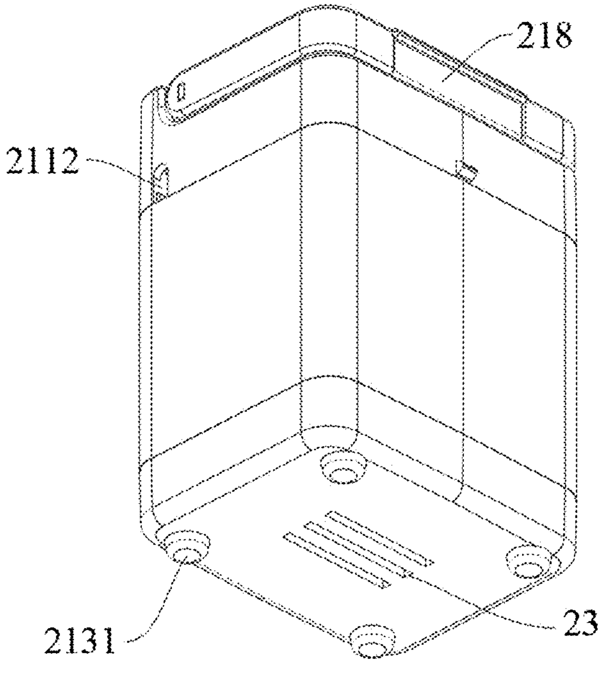
FIG. 2 is a schematic three-dimensional view of the integrated inflator/deflator air pump from another perspective according to Embodiment I.
Figure 3:
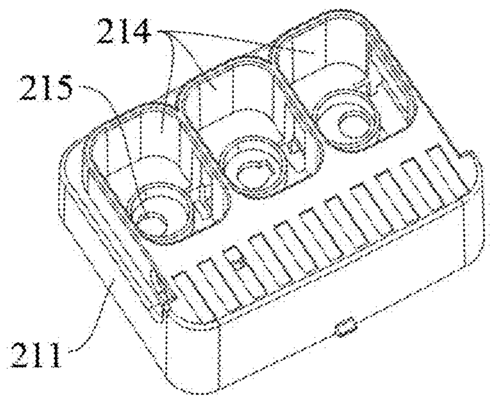
FIG. 3 is a schematic three-dimensional view of an upper casing of the integrated inflator/deflator air pump according to Embodiment I.

Referring to FIG. 1 and FIG. 2, in this embodiment, the first air port 22 is a part butted with an inflatable product. The pump casing 21 is further provided with second air ports 23 for communicating with outside air, and through the second air ports 23, the air is supplied to the blower assembly 27 or discharged from the blower assembly 27. In this embodiment, in order to facilitate the assembly, the pump casing 21 includes an upper casing 211, a middle casing 212 and a lower casing 213. The second air ports 23 may be provided on left and right sides of a front end surface of the middle casing 212 (avoiding the cooperation area of the reversing block) or on a bottom side of the lower casing 213.

Figure 5:
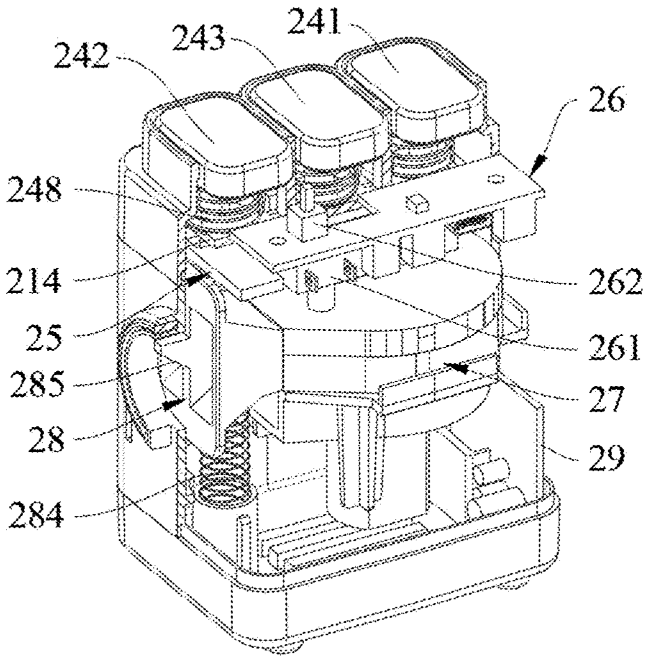
FIG. 5 is a schematic three-dimensional view of an internal structure of the integrated inflator/deflator air pump according to Embodiment I.
Figure 7:
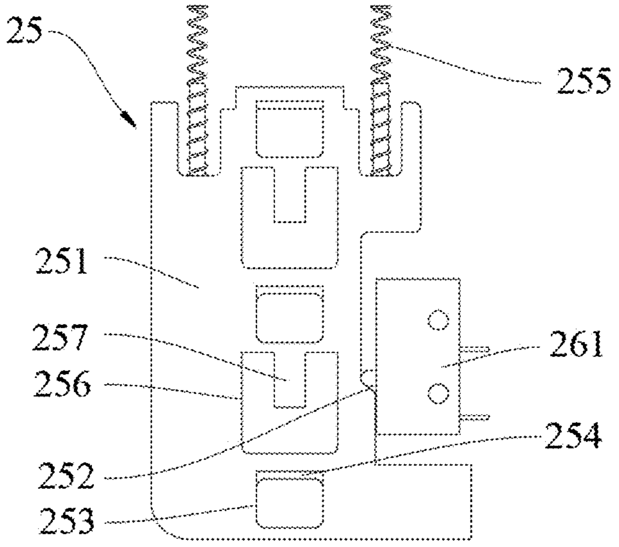
FIG. 7 is a schematic top view of a linkage plate of the integrated inflator/deflator air pump according to Embodiment I.

Referring to FIG. 5 and FIG. 7, the linkage plate 25 includes a linkage plate body 251, and a side surface of the linkage plate body 251 is provided with a trigger portion 252. The first microswitch 261 is arranged on a side surface of the linkage plate 25, and a contact of the first microswitch 261 correspondingly cooperates with the trigger portion 252, such that when the linkage plate 25 moves rearward, the first microswitch 261 is triggered by the trigger portion 252 so as to start the blower assembly 27. Linkage plate return springs 255 are further arranged between a rear end of the linkage plate 25 and an inner wall of the pump casing 21, and the linkage plate return springs 255 are configured to provide a force for the linkage plate 25 to return forward. The first microswitch is further configured to terminate a triggered state when the linkage plate 25 moves forward to its initial position, so as to stop the blower assembly 27.

Referring to FIG. 3 to FIG. 8, the top side of the pump casing 21 is provided with button grooves 214. The function buttons 24 include an inflation button 241, a deflation button 242 and a stop button 243, and are mounted in the corresponding button grooves 214. The function buttons 24 each include a button cap 244, a button rod 245 arranged at a lower side of the button cap 244, and a button return spring 248 located at an outer side of the button rod 245 and between the button cap and the button groove. A bottom side of the button groove 214 is further provided with a first via hole 215. The linkage plate 25 is arranged below the button grooves 214. The function button 24 is configured to cooperate with the linkage plate 25 after the button rod 245 runs through the corresponding first via hole 215 so as to convert a pressing force received by the function button 24 into power for the linkage plate 25 to move rearward.

Figure 6:
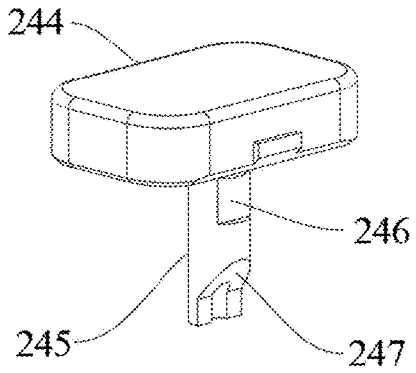
FIG. 6 is a schematic three-dimensional view of an inflation button in function buttons of the integrated inflator/deflator air pump according to Embodiment I.
Figure 8:
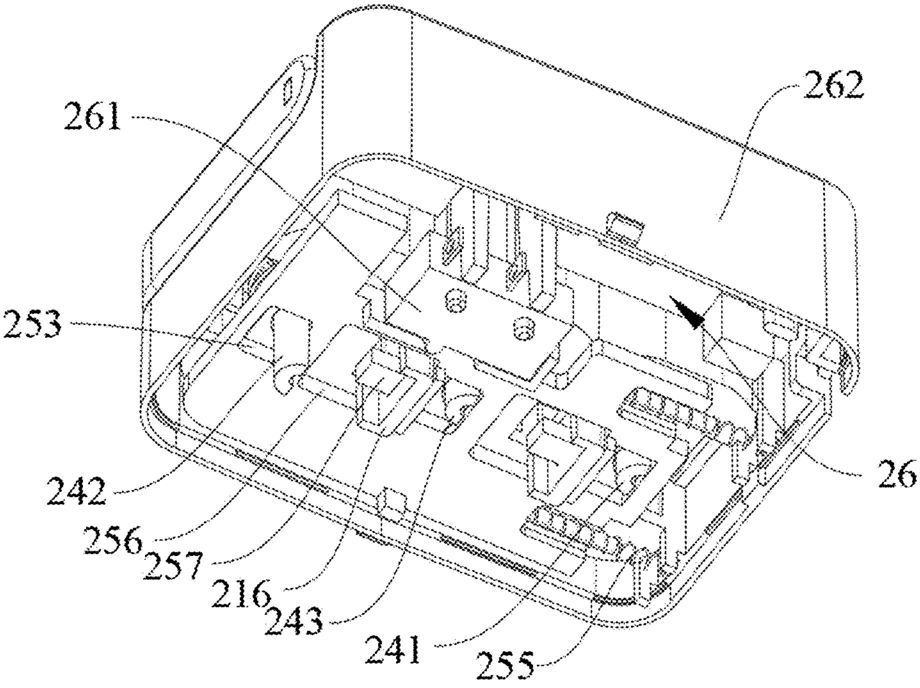
FIG. 8 is a schematic three-dimensional view of the function buttons, the linkage plate and a circuit board of the integrated inflator/deflator air pump mounted to the upper casing according to Embodiment I.

Referring to FIG. 6 to FIG. 8, the linkage plate 25 is provided with second via holes 253 for the button rods 245 of the function buttons 24 to run through. A top side of a rear end of each of the second via holes 253 is provided with a first slope 254. A side of the button rod 245 corresponding to the first slope 254 is provided with a second slope 247, such that when the function button 24 is pressed to move downward, the linkage plate moves rearward by cooperation between the second slope 247 and the first slope 254.

Referring to FIG. 6, FIG. 7, FIG. 14 and FIG. 15, the button rods 245 of the inflation button 241 and the deflation button 242 are provided with button clamping grooves 246 near top sides. Each of the button clamping grooves 246 cooperates with a rear end of the second via hole 253, such that when the inflation button 241 or the deflation button 242 is pressed to move downward until the button clamping groove 246 is located at the second via hole 253, the linkage plate 25 moves forward under the action of the linkage plate return springs 255, and the rear end of second via hole 253 abuts against the button clamping groove 246, so that the inflation button 241 or the deflation button 242 is stuck and remains in the pressed state and the linkage plate 25 remains in the state of triggering the first microswitch 261.

Figure 14:
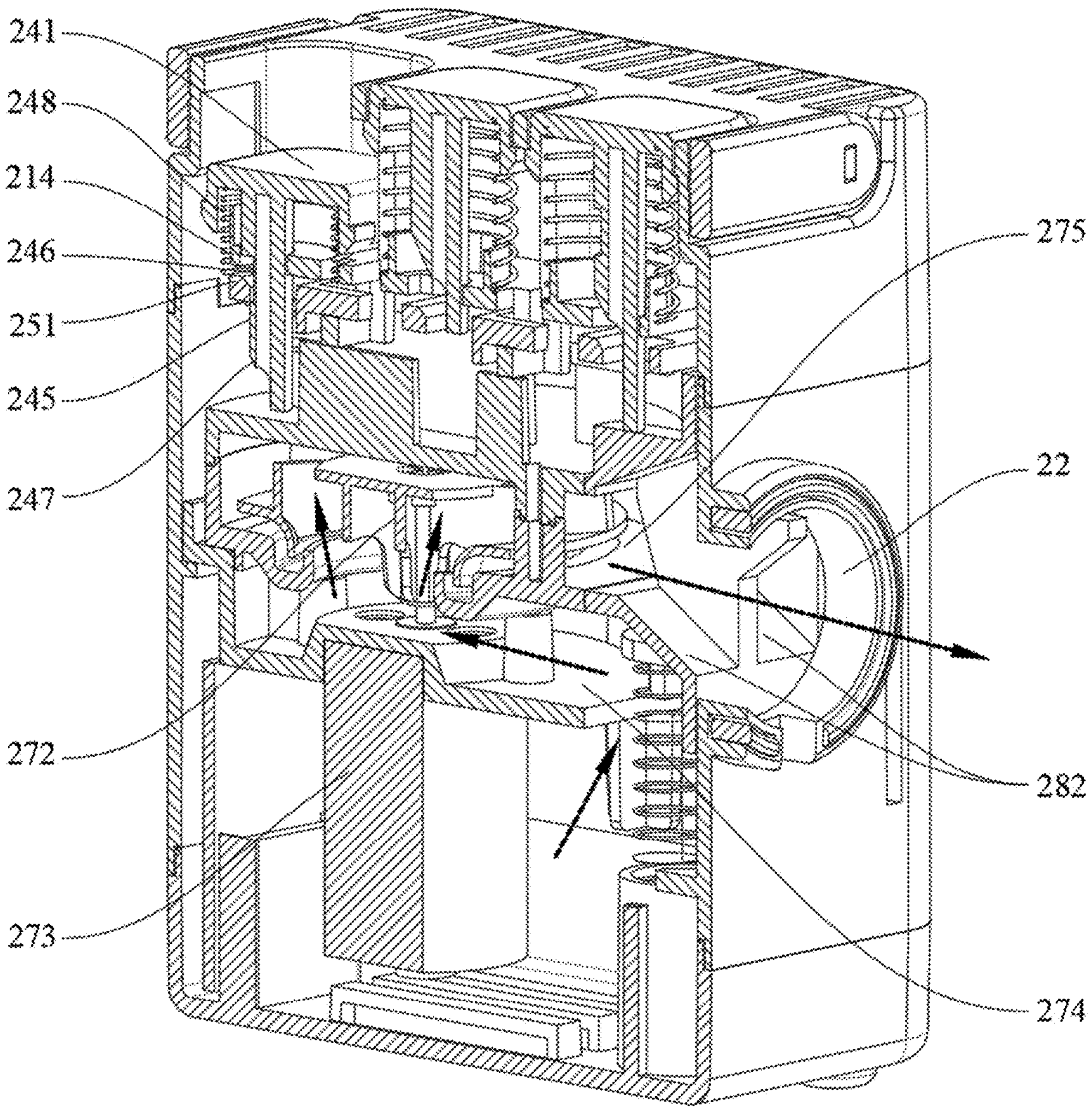
FIG. 14 is a schematic sectional view of the integrated inflator/deflator air pump in an inflation state taken along line A-A in FIG. 13 according to Embodiment I.
Figure 15:
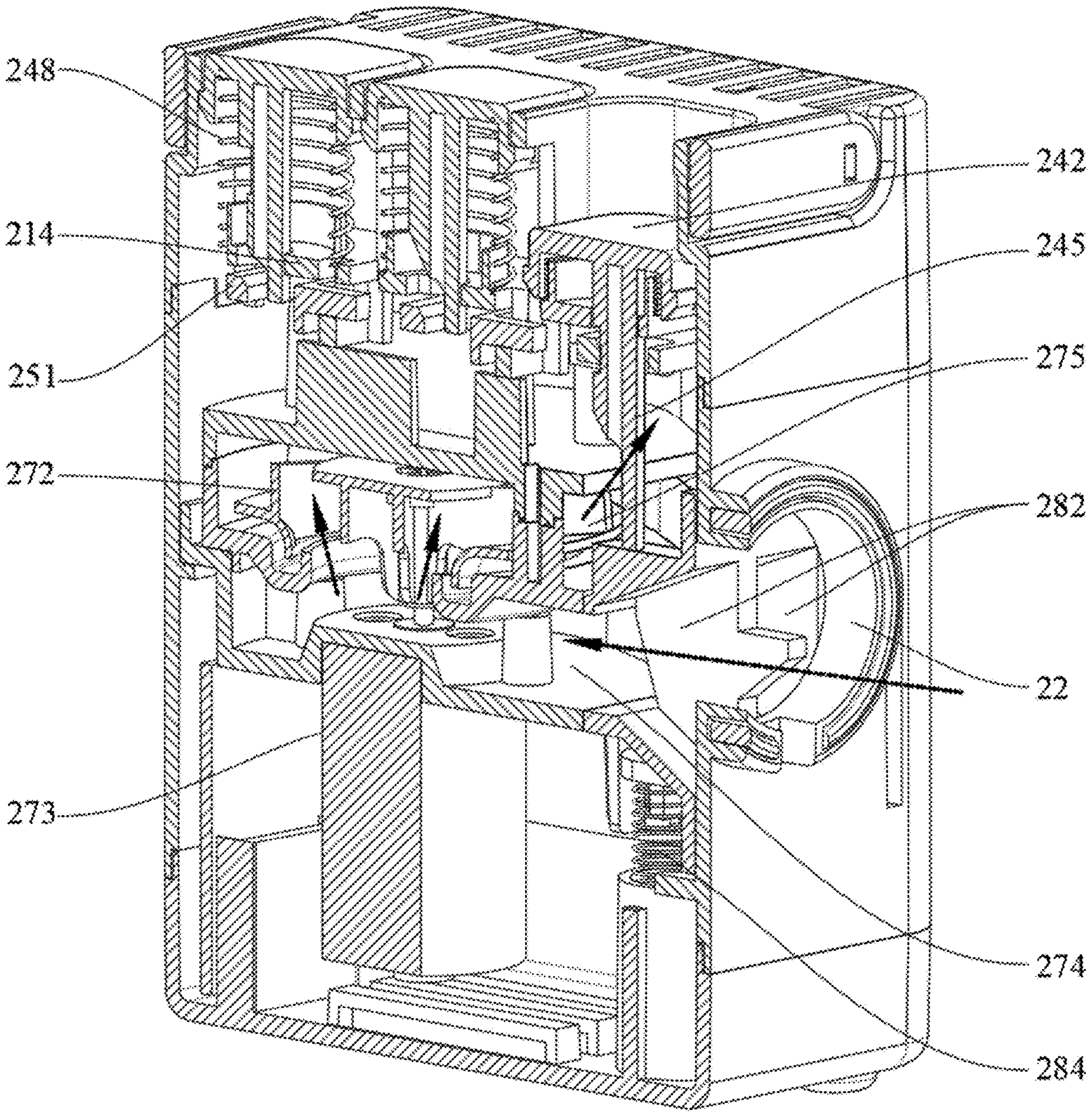
FIG. 15 is a schematic sectional view of the integrated inflator/deflator air pump in a deflation state taken along line A-A in FIG. 13 according to Embodiment I.

Referring to FIG. 14 and FIG. 15, the stop button 243 does not have a button clamping groove 246, and a distance by which the stop button 243 drives the linkage plate to move rearward is greater than a distance by which the inflation button 241 and/or the deflation button 242 drives the linkage plate to move rearward, such that when the stop button 243 is pressed, the linkage plate moves rearward and then is disengaged from the button clamping groove 246 of the inflation button 241 or the deflation button 242, and thereby the inflation button 241 or the deflation button 242 returns to its initial position under the action of the button return spring 248. The stop button 243 is further configured to return to its initial position under the action of the button return spring 248 after being released, and be out of contact with the linkage plate 25, such that the linkage plate 25 returns to its initial position under the action of the linkage plate return springs 255.

Figure 4:
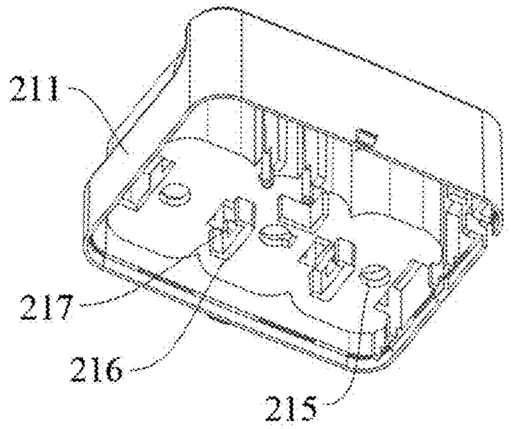
FIG. 4 is a schematic three-dimensional view of the upper casing of the integrated inflator/deflator air pump from another perspective according to Embodiment I.

Referring to FIG. 4, FIG. 7 and FIG. 8, the bottom sides of the button grooves 214 are further provided with positioning blocks 216. Each of the positioning blocks 216 is provided with a guide groove 217 in a front-rear direction. The linkage plate 25 is further provided with third via holes 256. A rear end of each of the third via holes 256 is provided with a slider portion 257 protruding forward. The positioning block 216 runs through the third via hole 256, and the slider portion 257 is slidably arranged in the guide groove 217 so as to provide a guide function for the linkage plate 25 to move forward and rearward.

Figure 9:
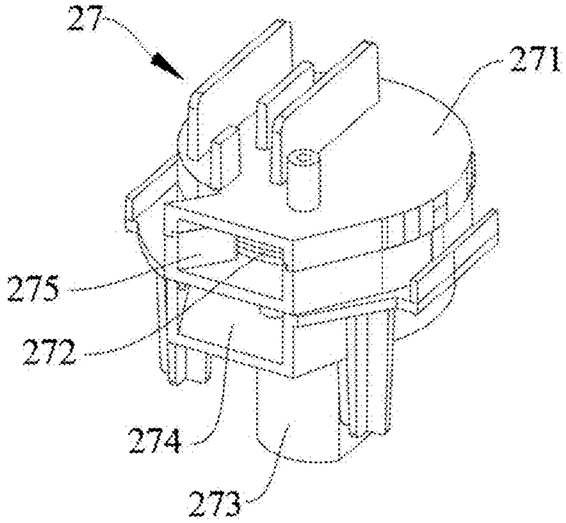
FIG. 9 is a schematic three-dimensional view of a blower assembly of the integrated inflator/deflator air pump according to Embodiment I.
Figure 10:
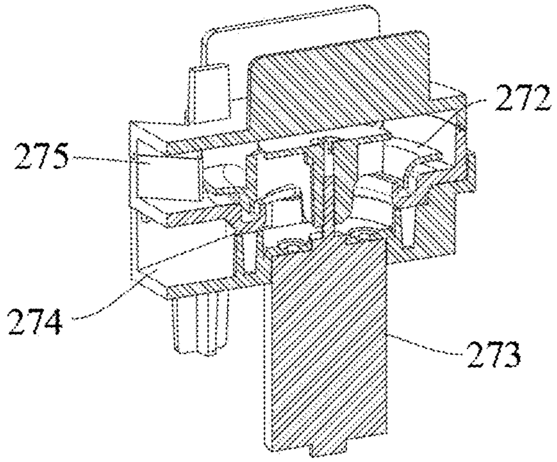
FIG. 10 is a schematic view of an internal structure of the blower assembly of the integrated inflator/deflator air pump according to Embodiment I.
Figure 11:
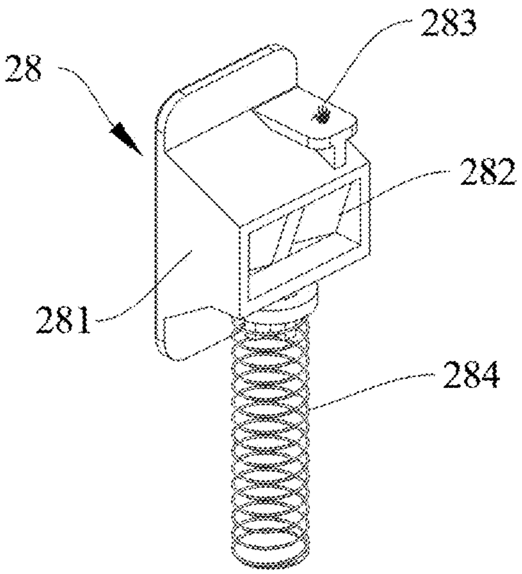
FIG. 11 is a schematic three-dimensional view of a reversing block of the integrated inflator/deflator air pump according to Embodiment I.
Figure 12:
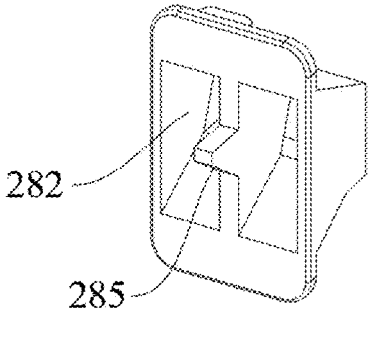
FIG. 12 is a schematic three-dimensional view of the reversing block of the integrated inflator/deflator air pump from another perspective according to Embodiment I.
Figure 13:
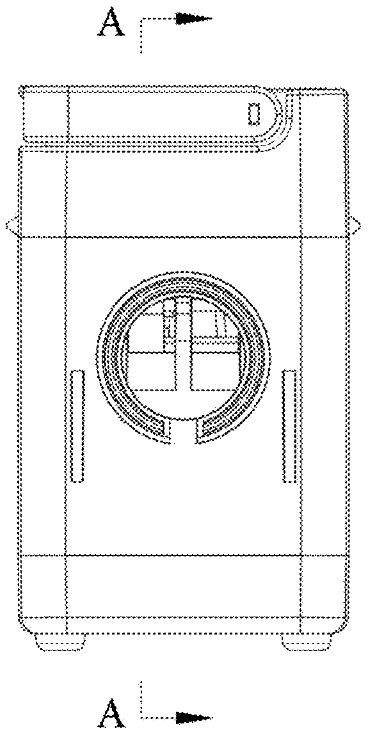
FIG. 13 is a schematic front view of the integrated inflator/deflator air pump according to Embodiment I.

Referring to FIG. 9 and FIG. 10, the blower assembly 27 includes a blower casing 271, an impeller 272 mounted in the blower casing 271, and a blower motor 273 mounted at a bottom side of the blower casing 271. A power output shaft of the blower motor 273 is mounted with the impeller 272. The blower casing 271 further has a blower flow channel therein, and the blower flow channel forms the blower air inlet 274 at a lower side of a front end surface of the blower casing 271 and forms the blower air outlet 275 at an upper side of the front end surface of the blower casing 271. The blower air inlet 274 and the blower air outlet 275 are located in a same plane, such that when the reversing block 28 moves up and down, the reversing flow channel 282 in the reversing block 28 is butted with the blower air inlet 274 or the blower air outlet 275.

Referring to FIG. 5, FIG. 11, FIG. 12, FIG. 14 and FIG. 15, the reversing block 28 includes a reversing block body 281, and the reversing flow channel 282 of the reversing block body 281 has a large front opening and a small rear opening. The rear opening of the reversing flow channel 282 is the same size as the blower air inlet 274 and the blower air outlet 275. The front opening of the reversing flow channel 282 keeps corresponding to the first air port 22 in upward and downward strokes of the reversing block 28. A top side of the reversing block body 281 is further provided with a press platform 283 configured to cooperate with the button rod 245 of the deflation button 242, such that the reversing block 28 moves downward when receiving a pressing force of the deflation button 242, thereby realizing switching from inflation to deflation. A reversing block return spring 284 is further arranged between a bottom side of the reversing block 28 and a bottom side of the pump casing 21, such that the reversing block 28 returns to its initial position when losing the pressing force of the deflation button 242, thereby realizing switching from deflation to inflation.

Referring to FIG. 2 and FIG. 5, a power board 29 is further arranged in the pump casing 21, the power board 29 is connected with a power cord, and an upper position of the pump casing 21 is further provided with a power cord via hole 2112 for the power cord to run through.

Referring to FIG. 1 and FIG. 2, the pump casing 21 is further provided with a handle 218. The handle 218 is hinged with the pump casing 21. When the handle 218 is not in use, it may be flipped over and stored in the pump casing 21.

According to the integrated inflator/deflator air pump of this embodiment, when the inflatable product needs to be inflated (as shown in FIG. 14), the first air port of the air pump is butted with an air valve of the inflatable product, and the inflation button is pressed down, such that the button rod of the inflation button runs downward through the second via hole in the linkage plate corresponding to the inflation button. At the same time, the second slope of the button rod cooperates with the first slope at the rear end of the second via hole, such that the linkage plate is pushed rearward when the inflation button is being pressed down. The linkage plate will trigger the first microswitch to start the blower motor of the blower assembly. At this time, the reversing block is in the initial position, i.e., the reversing flow channel of the reversing block is in communication with the blower air outlet of the blower assembly. Under the action of the impeller of the blower assembly, the air is sucked into the pump casing via the second air port, enters the blower flow channel via the blower air inlet of the blower assembly, is conveyed to the blower air outlet by the impeller, and then is outputted into the inflatable product via the first air port after passing through the reversing flow channel, so that the inflatable product is inflated. When the inflation button is pressed to the lower limit position, the button clamping groove in the button rod of the inflation button corresponds to the second via hole, and the linkage plate moves forward under the action of the linkage plate return springs, so that the rear end surface of the second via hole of the linkage plate abuts against the button clamping groove of the inflation button. At this time, the linkage plate remains in the state of triggering the first microswitch, and the inflation function continues. At the same time, the inflation button can be released, and the inflation button is stuck by the linkage plate and remains in the pressed state. When it is required to stop inflation, the stop button is pressed. Since the distance by which the stop button drives the linkage plate to move rearward is greater than the distance by which the inflation button drives the linkage plate to move rearward, when the stop button is pressed, the linkage plate moves rearward, such that the second via hole of the linkage plate corresponding to the inflation button is disengaged from the button clamping groove of the inflation button, and the inflation button is pushed up under the action of the button return spring so as to return to its initial position. At this time, the stop button is released, and the stop button is pushed up under the action of the button return spring so as to return to its initial position. The linkage plate is no longer limited by the function button and moves leftward under the action of the linkage plate return springs to return to its initial position, the linkage plate no longer triggers the first microswitch, and the blower assembly stops, so that the inflation is stopped.

The integrated inflator/deflator air pump of this embodiment further provides a function of deflating the inflatable product (as shown in FIG. 15). The first air port of the air pump is butted with the air valve of the inflatable product, and the deflation button is pressed down, such that the button rod of the deflation button runs downward through the second via hole in the linkage plate corresponding to the deflation button. At the same time, the second slope of the button rod cooperates with the first slope at the rear end of the second via hole, such that the linkage plate is pushed rearward when the deflation button is being pressed down. The linkage plate triggers the first microswitch to start the blower motor of the blower assembly. At this time, the reversing block is also pushed downward by the button rod of the deflation button synchronously, so that the reversing flow channel of the reversing block is in communication with the blower air inlet of the blower assembly. Under the action of the impeller of the blower assembly, the air is sucked out of the inflatable product, passes through the first air port and the reversing flow channel, enters the blower flow channel via the blower air inlet of the blower assembly, is conveyed to the blower air outlet by the impeller, enters the pump casing, and is discharged from the pump casing to the external environment via the second air port, so that the inflatable product is deflated. When the deflation button is pressed to the lower limit position, the button clamping groove in the button rod of the deflation button corresponds to the second via hole, and the linkage plate moves forward under the action of the linkage plate return springs, so that the rear end surface of the second via hole of the linkage plate abuts against the button clamping groove of the deflation button. At this time, the linkage plate remains in the state of triggering the first microswitch, and the deflation function continues. At the same time, the deflation button can be released, and the deflation button is stuck by the linkage plate and remains in the pressed state. When it is required to stop deflation, the stop button is pressed. Since the distance by which the stop button drives the linkage plate to move rearward is greater than the distance by which the deflation button drives the linkage plate to move rearward, when the stop button is pressed, the linkage plate moves rearward, such that the second via hole of the linkage plate corresponding to the deflation button is disengaged from the button clamping groove of the deflation button, and the deflation button is pushed up under the action of the button return spring so as to return to its initial position. At the same time, the reversing block loses the pressing action of the deflation button and moves upward under the action of the reversing block return spring so as to return to its initial position, and the reversing flow channel is switched from being butted with the blower air inlet of the blower assembly to being butted with the blower air outlet of the blower assembly. At this time, the stop button is released, and the stop button is pushed up under the action of the button return spring so as to return to its initial position. The linkage plate is no longer limited by the function button and moves leftward under the action of the linkage plate return springs to return to its initial position, the linkage plate no longer triggers the first microswitch, and the blower assembly stops, so that the deflation is stopped.

According to the integrated inflator/deflator air pump of this embodiment, the linkage plate moves when receiving the pressing power of the buttons. Through the pressing cooperation with the inflation button and the deflation button, the first microswitch cooperating with the linkage plate can be triggered, thereby starting the blower motor of the blower assembly. Through the design of locking the inflation button and the deflation button with the linkage plate (the button clamping grooves and the second via holes), the operation is made easier. Through the pressing cooperation of the stop button with the linkage plate, the lock between the linkage plate and the inflation button or the deflation button is undone, so that the inflation function or the deflation function can be stopped simply by pressing the stop button. The deflation button, when pressed, can not only drive the linkage plate to move, but also drive the reversing block to move such that the reversing flow channel is switched from being butted with the blower air outlet of the blower assembly to being butted with the blower air inlet of the blower assembly, thereby realizing switching from the inflation function to the deflation function. The linkage plate is simple in shape and reasonable and smooth in movement, and cannot be stuck easily. Through the cooperation between the linkage plate and the buttons, the corresponding functions can be realized by using the mechanical fit, which is more stable and reliable than by electronic control methods such as by a plurality of first microswitches.

Embodiment II

Figure 32:
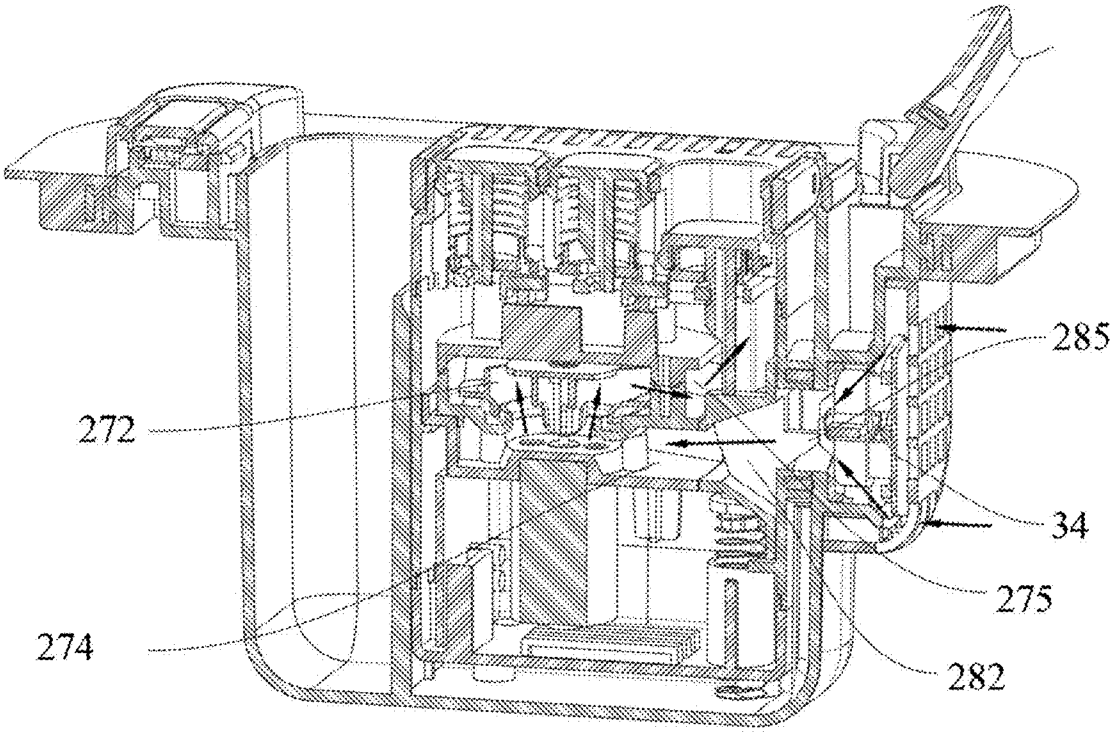
FIG. 32 is a schematic three-dimensional view of the mounting structure in the deflation state taken along line B-B in FIG. 29 according to Embodiment II.

Referring to FIG. 1 FIG. 32, this embodiment further provides a mounting structure for the integrated inflator/deflator air pump, including a mounting seat 1 combined with an inflatable product. The pump body 2 is embedded in the mounting seat 1. The mounting seat 1 includes a seat body 11. The seat body 11 is provided with a pump body accommodating cavity 116 for accommodating the pump body 2. A front end of the seat body 11 is provided with a third air port 111. An inner side of the seat body 11 is further provided with a positioning block 112 below the third air port 111. A bottom side of a first air port 22 of the pump body 2 is provided with a positioning groove 221. The positioning groove 221 cooperates with the positioning block 112, such that when the pump body 2 is mounted in the mounting seat 1, the first air port 22 of the pump body 2 directly corresponds to the third air port 111 by using the positioning groove 221 and the positioning block 112. An outer side of the mounting seat 1 is further provided with an air port cover 12 corresponding to the third air port 111.

Figure 19:
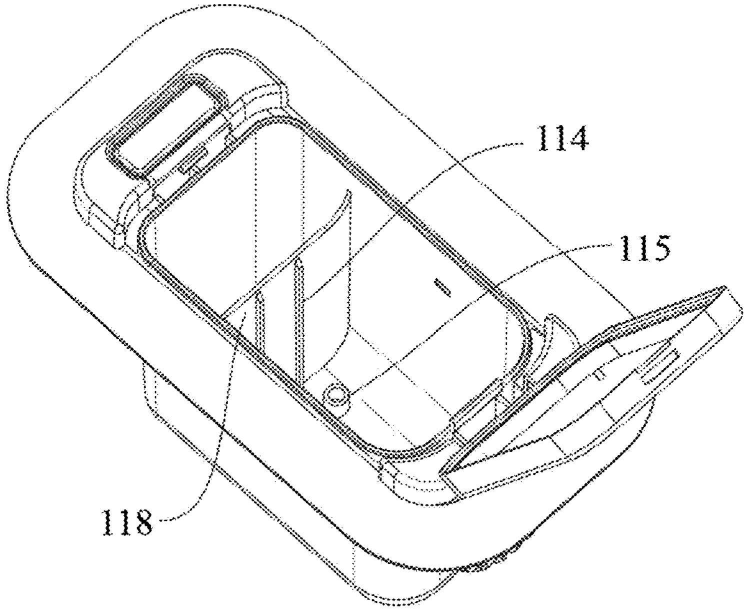
FIG. 19 is a schematic three-dimensional view of the mounting seat of the mounting structure in the lid open state from another perspective according to Embodiment II.
Figure 24:
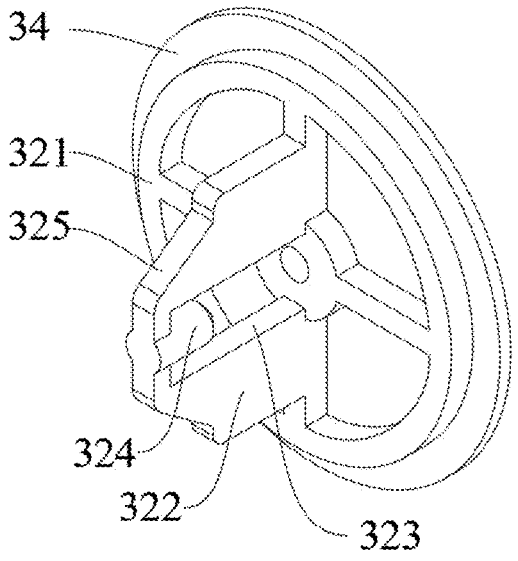
FIG. 24 is a schematic three-dimensional view of a valve spool of the one-way valve in the mounting structure according to Embodiment II.
Figure 25:
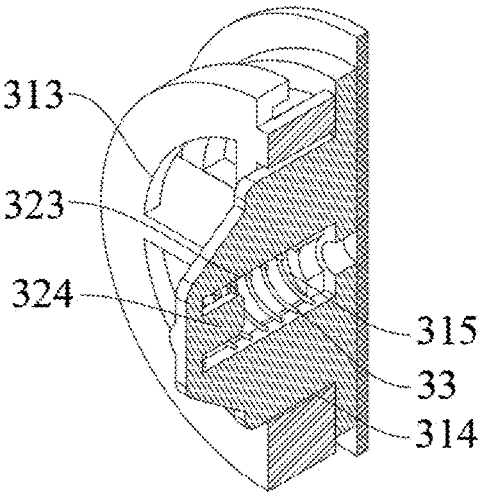
FIG. 25 is a schematic three-dimensional sectional view of the one-way valve in the mounting structure according to Embodiment II.
Figure 26:
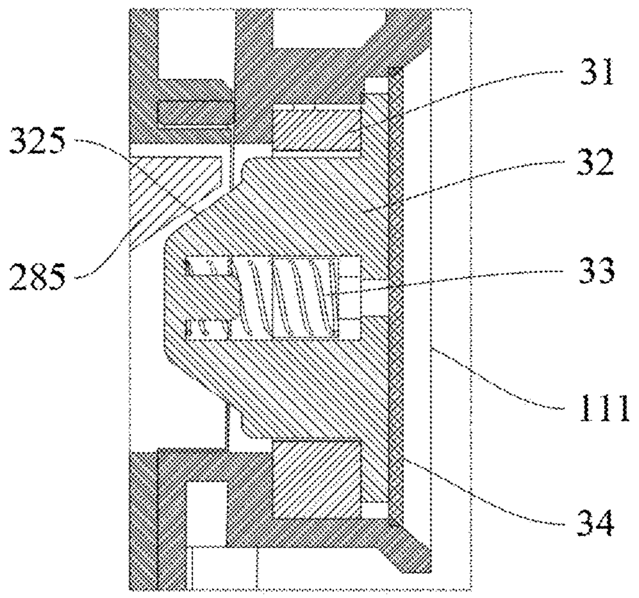
FIG. 26 is a schematic three-dimensional sectional view of the one-way valve mounted to a third air port in the mounting structure according to Embodiment II.

Referring to FIG. 1 and FIG. 19, a front end surface of the first air port 22 of the pump body 2 is provided with a sealing ring 222. A rear wall of the pump body accommodating cavity 116 of the mounting seat 1 is provided with rib portions 114. The rib portions 114 are configured to provide a limit for pressing the sealing ring 222 of the first air port 22 against an inner wall of the pump body accommodating cavity 116 of the seat body 11 when the pump body 2 is mounted into the mounting seat 1.

Referring to FIG. 1, FIG. 2, FIG. 18 and FIG. 19, the first air port 22 of the pump body 2 protrudes from a front end surface of a pump casing 21 such that a space for air circulation is left between a front side of the pump body 2 and the mounting seat 1. The rib portions 114 are also configured such that a space for air circulation is left between a rear side of the pump body 2 and the mounting seat 1. A bottom side of the pump body accommodating cavity 116 of the mounting seat 1 is provided with a first supporting block 115 protruding from a bottom surface of the pump body accommodating cavity 116. A bottom side of the pump casing 21 is provided with a second supporting block 2131. The first supporting block 115 cooperates with the second supporting block 2131 such that a space for air circulation is left between the bottom side of the pump body 2 and the mounting seat 1.

Figure 18:
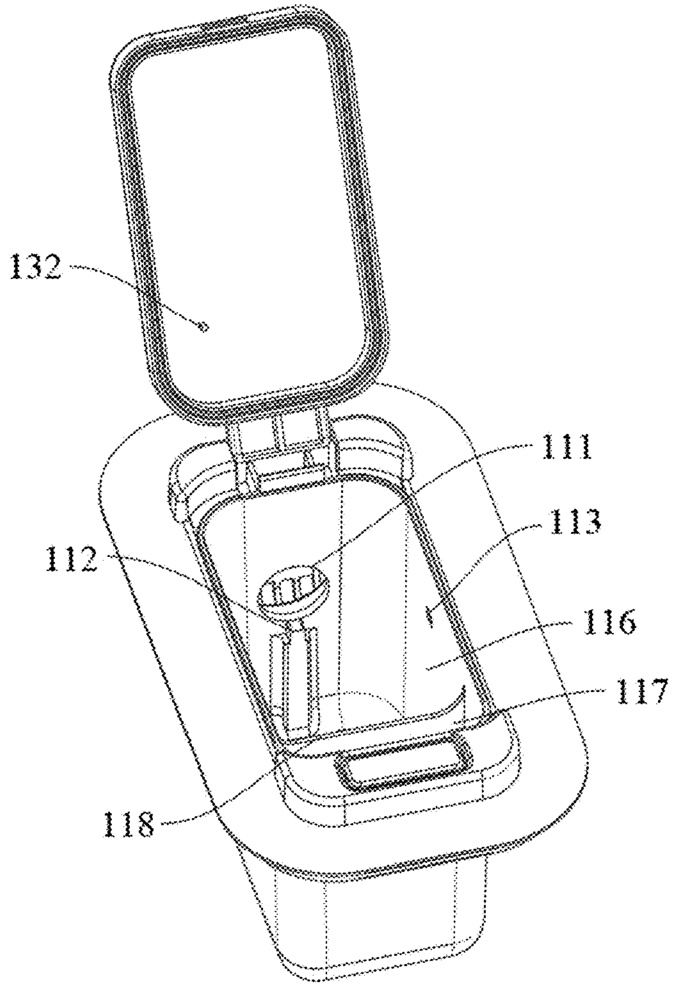
FIG. 18 is a schematic three-dimensional view of a mounting seat of the mounting structure in the lid open state according to Embodiment II.

Referring to FIG. 1 and FIG. 18, left and right sides of the pump body accommodating cavity 116 of the mounting seat 1 are provided with clamping grooves 113. Left and right sides of the pump casing 21 are provided with clamping protrusions 2111 corresponding to the clamping grooves 113, and the clamping protrusions 2111 cooperate with the clamping grooves 113 such that the pump body 2 is embedded in the mounting seat 1.

Figure 16:
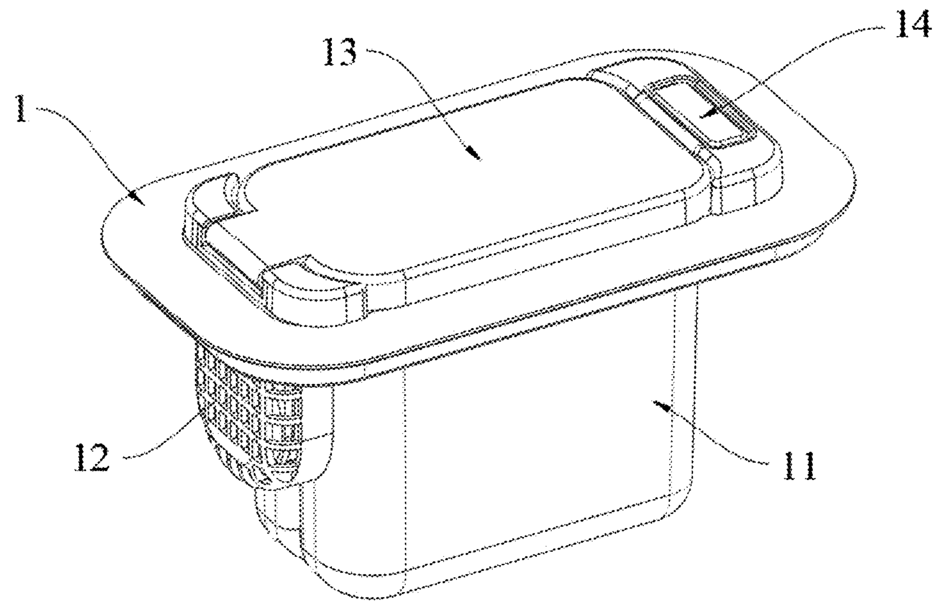
FIG. 16 is a schematic three-dimensional view of a mounting structure according to Embodiment II.
Figure 17:
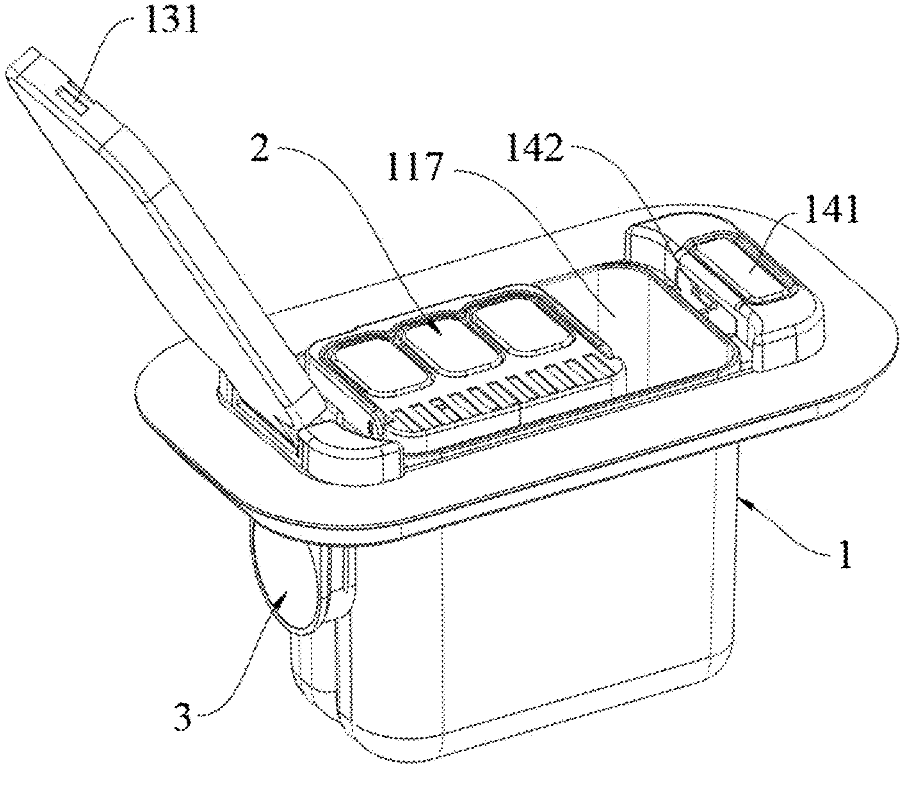
FIG. 17 is a schematic three-dimensional view of the mounting structure in a lid open state with an air port cover removed according to Embodiment II.

Referring to FIG. 16 and FIG. 17, the mounting seat 1 further includes a lid 13. One end of the lid 13 is hinged with the mounting seat 1, and the other end is connected to the mounting seat 1 through a snap-fit assembly 14. Specifically, the snap-fit assembly 14 includes a snap-fit button 141 and a snap-fit tongue 142. The lid 13 is provided with a recess 131 corresponding to the snap-fit tongue 142. The snap-fit button 141 is configured to allow the snap-fit tongue 142 to retract and be disengaged from the recess 131 when being pressed, such that the lid 13 can be opened from the mounting seat 1.

Referring to FIG. 1, FIG. 5 and FIG. 18, a top side of the pump casing 21 is further provided with a switch hole 219. A circuit board 26 of the pump body 2 is further connected with a second microswitch 262. A contact of the second microswitch 262 corresponds to the switch hole 219. An inner side of the lid 13 is provided with a convex column 132. The second microswitch 262 is configured to be triggered by the convex column 132 running through the switch hole 219 when the lid 13 is flipped over to cover the mounting seat 1 so as to make the pump body 2 stop working.

Referring to FIG. 17 to FIG. 19, the seat body 11 is further provided with a power cord accommodating cavity 117 therein configured to store a power cord of the pump body 2. A partition 118 is arranged between the power cord accommodating cavity 117 and the pump body accommodating cavity 116, and a height of the partition 118 is less than that of a power cord via hole of the pump body 2. The rib portions 114 are arranged at a front side of the partition 118.

Referring to FIG. 17 and FIG. 20, a front end of the reversing block 28 is further provided with a shifting portion 285. The third air port 111 of the mounting seat 1 is further provided with a one-way valve 3. The blower assembly 27 is configured to allow air to pass through a blower air outlet 275 and a reversing flow channel 282, push up the one-way valve 3 and enter the inflatable product when the reversing flow channel 282 of the reversing block 28 is butted with the blower air outlet 275, so as to inflate the inflatable product. The blower assembly 27 is further configured to allow the air to enter a blower air inlet from the inflatable product against the one-way valve 3 when the reversing flow channel 282 of the reversing block 28 is butted with the blower air inlet 274 and after the shifting portion 285 of the reversing block 28 pushes up the one-way valve 3, so as to deflate the inflatable product.

Referring to FIG. 20 to FIG. 28, a front end of the third air port 111 is provided with a mounting cavity 1111. The one-way valve 3 includes a valve seat 31 mounted in the mounting cavity 1111, a valve spool 32 mounted at the valve seat 31, and a valve plate 34 located at a front end of the valve spool 32. The valve spool 32 has a freedom to move forward and rearward along the valve seat 31. The valve plate 34 is configured to move forward and rearward under the control of air pressures on two sides of the third air port 111, so as to cooperate with an inner wall of the third air port 111 to open or close the third air port 111. A rear end of the valve spool 32 protrudes from a rear side of the valve seat 31, the rear end of the valve spool 32 is further provided with a guide portion 325 configured to convert downward power of the shifting portion 285 into power for the valve spool 32 to move forward such that the valve plate 34 is pushed away from the inner wall of the third air port 111 to open the third air port 111. A valve spool return spring 33 is further arranged between the valve seat 31 and the valve spool 32. The valve spool return spring 33 is configured to allow the valve spool 32 to return to its initial position such that the valve plate 34 contacts the third air port 111 to close the third air port 111. Specifically, the guide portion 325 is a first slope going down from front to rear. A front lower side of the shifting portion 285 has a second slope going down from front to rear. The first slope cooperates with the second slope to convert downward power of the shifting portion 285 into power for the valve spool 32 to move forward.

Referring to FIG. 21 and FIG. 22, the valve seat 31 includes a fixed disk 311. A periphery of the fixed disk 311 is configured to be mounted and fixed to an inner wall of the mounting cavity 1111. The valve spool 32 includes a movable disk 321 located in front of the fixed disk 311, and the fixed disk 311 is provided with a gas channel 313. A space for a gas to pass through is left between the fixed disk 311 and the movable disk 321. Specifically, the rear end of the fixed disk 311 is provided with a cushion portion 312, such that the space for the gas to pass through is formed between the fixed disk 311 and the movable disk 321.

Referring to FIG. 22 to FIG. 25, the fixed disk 311 is further provided with a sliding groove 314. A rear end of the movable disk 321 is provided with a slider portion 322. The slider portion 322 runs rearward through the sliding groove 314, and a rear end of the slider portion 322 is exposed from a rear end of the fixed disk 311. The guide portion 325 is arranged at the rear end of the slider portion 322.

Referring to FIG. 22 to FIG. 25, the slider portion 322 is provided with a first spring groove 323. The fixed disk 311 is provided with a second spring groove 315 corresponding to the first spring groove 323. A rear end of the valve spool return spring 33 abuts against a rear end of the first spring groove 323, and a front end of the valve spool return spring 33 abuts against a front end of the second spring groove 315. Specifically, the second spring groove 315 is a stepped hole. The front end of the valve spool return spring 33 abuts against a step surface 3151 of the stepped hole. The rear end of the first spring groove 323 is further provided with a convex column 324, and the rear end of the valve spool return spring 33 is sleeved on the convex column 324.

Referring to FIG. 20, FIG. 22 and FIG. 23, a peripheral side of the fixed disk 311 is further provided with a foolproof opening 316. The inner wall of the mounting cavity 1111 of the third air port 111 is provided with a positioning portion 1112. The foolproof opening 316 cooperates with the positioning portion 1112 such that the fixed disk 311 is directionally mounted in the mounting cavity 1111.

Figure 27:
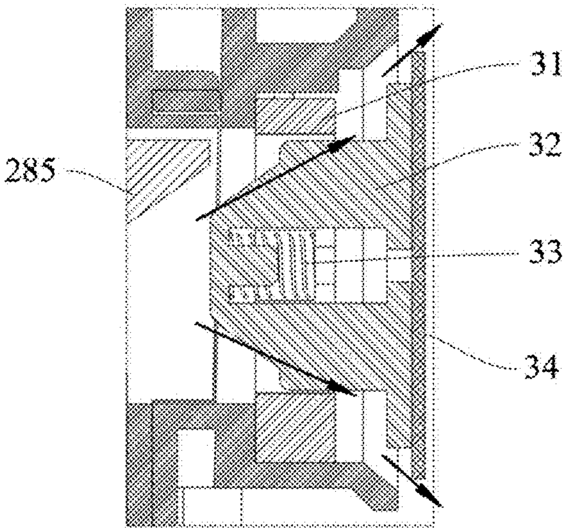
FIG. 27 is a schematic three-dimensional sectional view of the one-way valve mounted to the third air port in the mounting structure in an inflation state according to Embodiment II.
Figure 28:
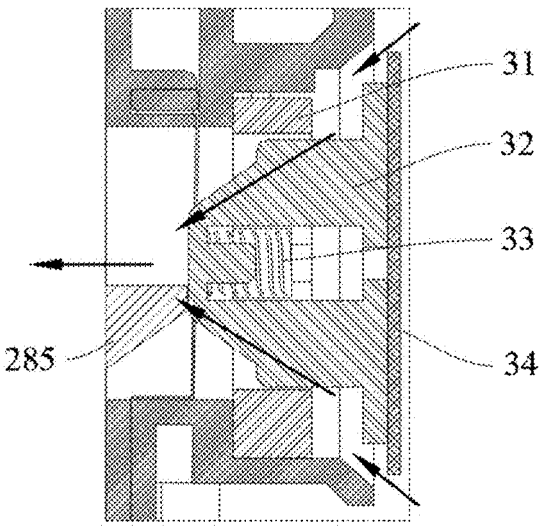
FIG. 28 is a schematic three-dimensional sectional view of the one-way valve mounted to the third air port in the mounting structure in a deflation state according to Embodiment II.
Figure 29:
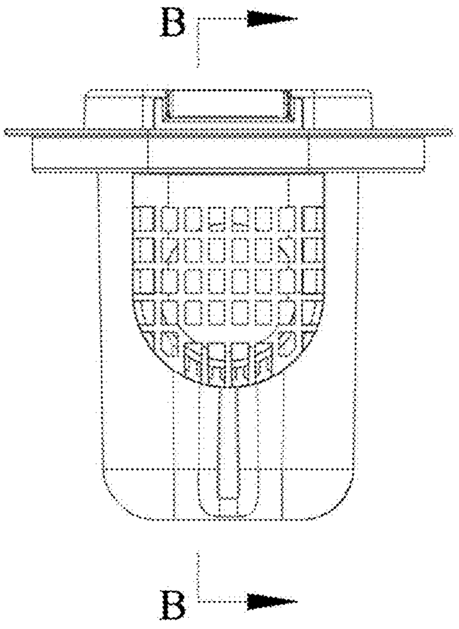
FIG. 29 is a schematic front view of the mounting structure according to Embodiment II.
Figure 30:
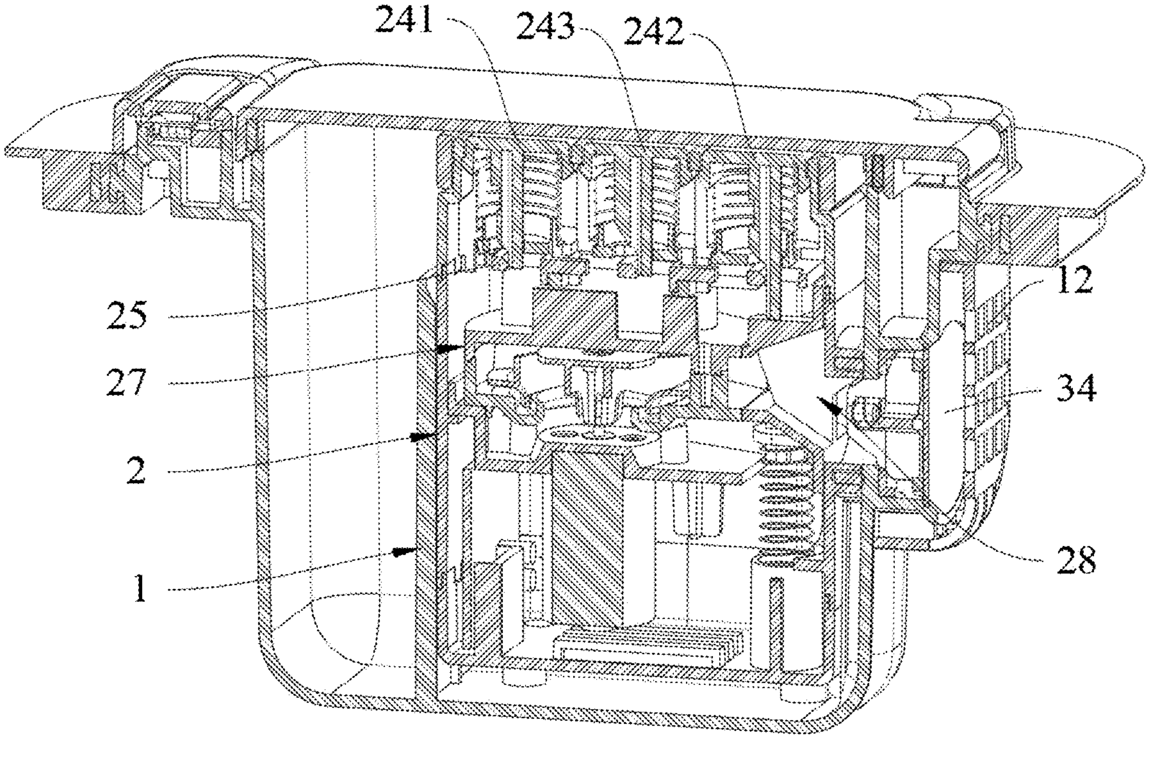
FIG. 30 is a schematic three-dimensional view of FIG. 29 taken along line B-B.
Figure 31:
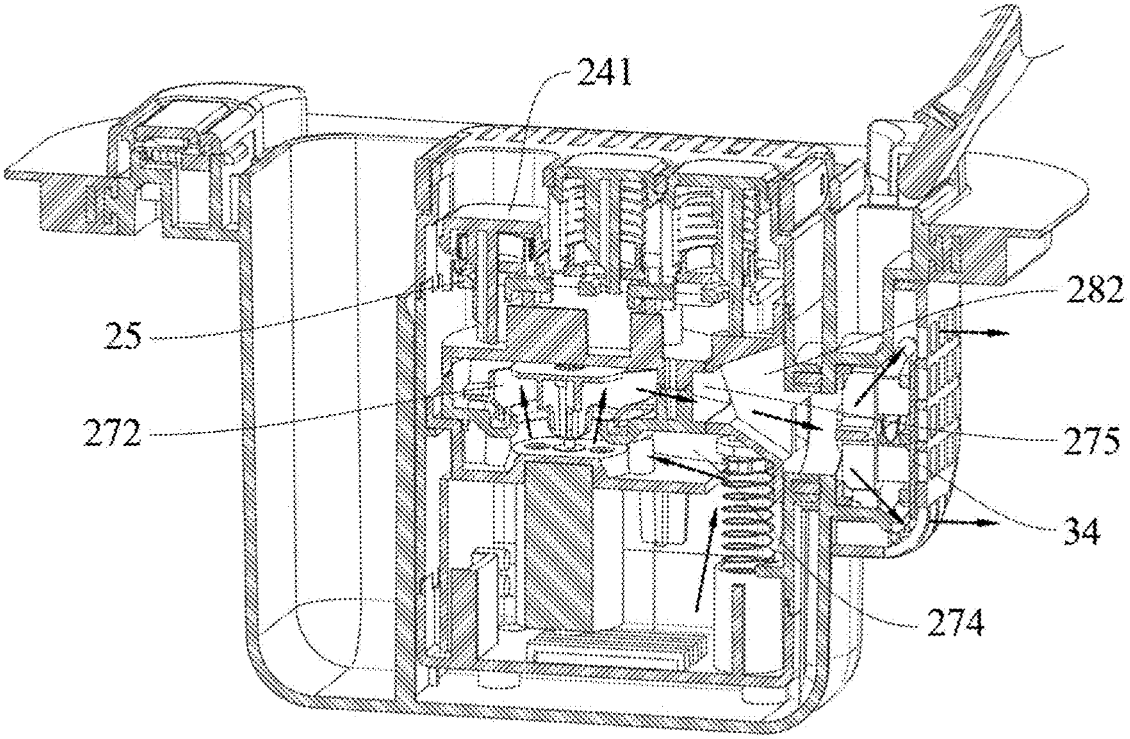
FIG. 31 is a schematic three-dimensional view of the mounting structure in the inflation state taken along line B-B in FIG. 29 according to Embodiment II.

According to the integrated inflator/deflator built-in air pump of this embodiment, the snap-fit button is pressed, such that the snap-fit tongue retracts, and the lid is unlocked and opened. When the inflatable product needs to be inflated (as shown in FIG. 14, FIG. 27 and FIG. 31), the inflation button is pressed. When the inflation button is being pressed down, the linkage plate is driven to move, the linkage plate triggers the first microswitch, and the blower assembly works. Under the action of the impeller of the blower assembly, the air from the outside enters the pump casing through the space between the pump body and the mounting seat and the second air port. In this state, the reversing flow channel of the reversing block is butted with the blower air outlet of the blower assembly. The air is sucked in by the blower assembly from the pump casing via the blower air inlet, and sent out via the blower air outlet. The air enters the first air port via the reversing flow channel, and overcomes the elastic force of the valve spool return spring (the valve spool return spring between the valve spool and the valve seat is further compressed) to push the valve plate and the valve spool to move forward, so that the valve plate is separated from the inner wall of the third air port. Thereby, the channel of the third air port for conveying the air forward is opened, such that air is further sent into the inflatable product via the third air port. When the inflation of the inflatable product needs to be stopped, the stop button is pressed down, the stop button drives the linkage plate to be disengaged from the inflation button, the linkage plate no longer triggers the first microswitch (the linkage plate returns to its initial position by using the return springs at the rear end of the linkage plate), and the blower assembly stops working, such that the inflation is stopped. At this time, the air pressure at the front side of the valve plate is greater than the air pressure at the rear side. Under the combined actions of the pressure difference and the valve spool return spring, the valve plate is pushed to move rearward, such that the valve plate is pressed against the inner wall of the third air port, thereby closing the third air port. When the inflatable product needs to be deflated (as shown in FIG. 15, FIG. 28 and FIG. 32), the deflation button is pressed. When the deflation button is being pressed down, the linkage plate is driven to move, the linkage plate triggers the first microswitch, and the blower assembly works. At the same time, the deflation button also presses down the reversing block, such that the reversing flow channel of the reversing block is butted with the blower air inlet of the blower assembly. When the reversing block is pressed down to move downward, the shifting portion of the reversing block drives the valve spool to move forward, such that the valve plate is separated from the inner wall of the third air port, thereby opening the air channel between the third air port and the inflatable product. Under the combined actions of the impeller of the blower assembly and the air pressure of the inflatable product, the air is discharged from the inflatable product, passes through the third air port, the first air port and the reversing flow channel, enters the blower assembly via the blower air inlet, enters the pump casing via the blower air outlet of the blower assembly, and is discharged to the outside via the second air ports and the space between the pump body and the mounting seat. When the deflation of the inflatable product needs to be stopped, the stop button is pressed down. The stop button drives the linkage plate to be disengaged from the deflation button, the deflation button returns to its initial position (under the action of the button return spring), the reversing block returns to its initial position (under the action of the reversing block return spring), the linkage plate no longer triggers the first microswitch (returns to its initial position under the action of the linkage plate return springs), the blower assembly stops working, and the air discharging is stopped. The valve spool of the one-way valve is no longer limited by the shifting portion. Under the action of the elastic force of the valve spool return spring, the valve spool moves rearward relative to the valve seat, so that the valve plate is pushed to move rearward until the valve plate contacts the inner wall of the third air port, thereby closing the third air port. In order to prevent the lid from being closed accidentally, causing adverse effects on the running pump body, the convex column and the second microswitch are designed, such that when the lid covers the mounting seat, the second microswitch is triggered to shut down the blower assembly.

According to the integrated inflator/deflator built-in air pump of this embodiment, the pump body can be pulled out of the mounting seat by using the handle.

Embodiment III

This embodiment further provides an inflatable product, including the aforementioned mounting structure. A mounting seat 1 is mounted and combined with the inflatable product. A pump body 2 is mounted in the mounting seat 1, and a third air port 111 of the mounting seat 1 is in communication with an air cavity and an air passage of the inflatable product. The one-way valve 3 controls the air passage to open or close.

The above embodiments should not limit the invention in any way, and all technical solutions obtained by equivalent substitution or equivalent transformation shall fall within the protection scope of the invention.

What is claimed is:

1. A mounting structure having an integrated inflator/deflator air pump, comprising:

a pump body, wherein the pump body comprises a pump casing, a first air port located at a front side of the pump casing, and function buttons arranged at a top side of the pump casing; a linkage plate movable forward and rearward is further arranged in the pump casing; a circuit board is further arranged in the pump casing, and the circuit board is provided with a first microswitch triggerable by the linkage plate; a blower assembly is further arranged in the pump casing; the blower assembly is configured to start when the first microswitch is triggered; the blower assembly has a blower air inlet and a blower air outlet, and both the blower air inlet and the blower air outlet are arranged at a front end surface of the blower assembly; a reversing block movable up and down is further arranged between the front end surface of the blower assembly and the first air port; a reversing flow channel is arranged in the reversing block; and the reversing block is configured to switch the reversing flow channel between the blower air inlet and the blower air outlet of the blower assembly, such that the blower air inlet of the blower assembly is in communication with the first air port to provide a deflation function or the blower air outlet of the blower assembly is in communication with the first air port to provide an inflation function;

a mounting seat combined with an inflatable product; the pump body is embedded in the mounting seat; the mounting seat comprises a seat body; the seat body is provided with a pump body accommodating cavity for accommodating the pump body; a front end of the seat body is provided with a third air port; an inner side of the seat body is further provided with a positioning block below the third air port; a bottom side of a first air port of the pump body is provided with a positioning groove; and the positioning groove cooperates with the positioning block, such that when the pump body is mounted in the mounting seat, the first air port of the pump body directly corresponds to the third air port by using the positioning groove and the positioning block;

a front end of the reversing block is further provided with a shifting portion; the third air port of the mounting seat is further provided with a one-way valve; the blower assembly is configured to allow air to pass through a blower air outlet and a reversing flow channel, push up the one-way valve and enter the inflatable product when the reversing flow channel of the reversing block is butted with the blower air outlet, so as to inflate the inflatable product; and the blower assembly is further configured to allow the air to enter a blower air inlet from the inflatable product against the one-way valve when the reversing flow channel of the reversing block is butted with the blower air inlet and after the shifting portion of the reversing block pushes up the one-way valve, so as to deflate the inflatable product.

2. The mounting structure according to claim 1, wherein a front end surface of the first air port of the pump body is provided with a sealing ring; a rear wall of the pump body accommodating cavity of the mounting seat is provided with rib portions; and the rib portions are configured to provide a limit for pressing the sealing ring of the first air port against an inner wall of the pump body accommodating cavity of the seat body when the pump body is mounted into the mounting seat.

3. The mounting structure according to claim 2, wherein the first air port of the pump body protrudes from a front end surface of a pump casing such that a space for air circulation is left between a front side of the pump body and the mounting seat; the rib portions are also configured such that a space for air circulation is left between a rear side of the pump body and the mounting seat; a bottom side of the pump body accommodating cavity of the mounting seat is provided with a first supporting block protruding from a bottom surface of the pump body accommodating cavity; a bottom side of the pump casing is provided with a second supporting block; and the first supporting block cooperates with the second supporting block such that a space for air circulation is left between the bottom side of the pump body and the mounting seat.

4. The mounting structure according to claim 3, wherein left and right sides of the pump body accommodating cavity of the mounting seat are provided with clamping grooves; and left and right sides of the pump casing are provided with clamping protrusions corresponding to the clamping grooves, and the clamping protrusions cooperate with the clamping grooves such that the pump body is embedded in the mounting seat.

5. The mounting structure according to claim 1, wherein the mounting seat further comprises a lid; and one end of the lid is hinged with the mounting seat, and the other end is connected to the mounting seat through a snap-fit assembly.

6. The mounting structure according to claim 5, wherein a top side of the pump casing is further provided with a switch hole; a circuit board of the pump body is further connected with a second microswitch; a contact of the second microswitch corresponds to the switch hole; an inner side of the lid is provided with a convex column; and the second microswitch is configured to be triggered by the convex column running through the switch hole when the lid is flipped over to cover the mounting seat so as to make the pump body stop working.

7. The mounting structure according to claim 1, wherein the seat body is further provided with a power cord accommodating cavity therein configured to store a power cord of the pump body; a partition is arranged between the power cord accommodating cavity and the pump body accommodating cavity, and a height of the partition is less than that of a power cord via hole of the pump body; and the rib portions are arranged at a front side of the partition.

8. The mounting structure according to claim 1, wherein a front end of the third air port is provided with a mounting cavity; the one-way valve comprises a valve seat mounted in the mounting cavity, a valve spool mounted at the valve seat, and a valve plate located at a front end of the valve spool; the valve spool has a freedom to move forward and rearward along the valve seat; the valve plate is configured to move forward and rearward under the control of air pressures on two sides of the third air port, so as to cooperate with an inner wall of the third air port to open or close the third air port; a rear end of the valve spool protrudes from a rear side of the valve seat, the rear end of the valve spool is further provided with a guide portion configured to convert downward power of the shifting portion into power for the valve spool to move forward such that the valve plate is pushed away from the inner wall of the third air port to open the third air port; a valve spool return spring is further arranged between the valve seat and the valve spool; and the valve spool return spring is configured to allow the valve spool to return to its initial position such that the valve plate contacts the third air port to close the third air port.

9. The mounting structure according to claim 8, wherein the valve seat comprises a fixed disk; a periphery of the fixed disk is configured to be mounted and fixed to an inner wall of the mounting cavity; the valve spool comprises a movable disk located in front of the fixed disk, and the fixed disk is provided with a gas channel; and a space for a gas to pass through is left between the fixed disk and the movable disk.

10. The mounting structure according to claim 9, wherein the fixed disk is further provided with a sliding groove; a rear end of the movable disk is provided with a slider portion; the slider portion runs rearward through the sliding groove, and a rear end of the slider portion is exposed from a rear end of the fixed disk; and the guide portion is arranged at the rear end of the slider portion.

11. The mounting structure according to claim 10, wherein the slider portion is provided with a first spring groove; the fixed disk is provided with a second spring groove corresponding to the first spring groove; and a rear end of the valve spool return spring abuts against a rear end of the first spring groove, and a front end of the valve spool return spring abuts against a front end of the second spring groove.

12. The mounting structure according to claim 9, wherein a peripheral side of the fixed disk is further provided with a foolproof opening; the inner wall of the mounting cavity of the third air port is provided with a positioning portion; and the foolproof opening cooperates with the positioning portion such that the fixed disk is directionally mounted in the mounting cavity.

13. The mounting structure according to claim 1, wherein the linkage plate is provided with a trigger portion; the first microswitch is arranged on a side surface of the linkage plate, and a contact of the first microswitch correspondingly cooperates with the trigger portion, such that when the linkage plate moves rearward, the first microswitch is triggered by the trigger portion so as to start the blower assembly; linkage plate return springs are further arranged between a rear end of the linkage plate and an inner wall of the pump casing, and the linkage plate return springs are configured to provide a force for the linkage plate to return forward; and the first microswitch is further configured to terminate a triggered state when the linkage plate moves forward to its initial position, so as to stop the blower assembly.

14. The mounting structure according to claim 13, wherein the top side of the pump casing is provided with button grooves; the function buttons comprise an inflation button, a deflation button and a stop button, and are mounted in the corresponding button grooves; the function buttons each comprise a button cap, a button rod arranged at a lower side of the button cap, and a button return spring located at an outer side of the button rod and between the button cap and the button groove; a bottom side of the button groove is further provided with a first via hole; the linkage plate is arranged below the button grooves; and the function button is configured to cooperate with the linkage plate after the button rod runs through the corresponding first via hole so as to convert a pressing force received by the function button into power for the linkage plate to move rearward.

15. The mounting structure according to claim 14, wherein the linkage plate is provided with second via holes for the button rods of the function buttons to run through; a top side of a rear end of each of the second via holes is provided with a first slope; and a side of the button rod corresponding to the first slope is provided with a second slope, such that when the function button is pressed to move downward, the linkage plate moves rearward by cooperation between the second slope and the first slope.

16. The mounting structure according to claim 14, characterized in that the button rods of the inflation button and the deflation button are provided with button clamping grooves near top sides; each of the button clamping grooves cooperates with a rear end of the second via hole, such that when the inflation button or the deflation button is pressed to move downward until the button clamping groove is located at the second via hole, the linkage plate moves forward under the action of the linkage plate return springs, and the rear end of second via hole abuts against the button clamping groove, so that the inflation button or the deflation button is stuck and remains in the pressed state and the linkage plate remains in the state of triggering the first microswitch; the stop button does not have a button clamping groove, and a distance by which the stop button drives the linkage plate to move rearward is greater than a distance by which the inflation button and/or the deflation button drives the linkage plate to move rearward, such that when the stop button is pressed, the linkage plate moves rearward and then is disengaged from the button clamping groove of the inflation button or the deflation button, and thereby the inflation button or the deflation button returns to its initial position under the action of the button return spring; and the stop button is further configured to return to its initial position under the action of the button return spring after being released, and be out of contact with the linkage plate, such that the linkage plate returns to its initial position under the action of the linkage plate return springs.

17. The mounting structure according to claim 14, wherein the bottom sides of the button grooves are further provided with positioning blocks; each of the positioning blocks is provided with a guide groove in a front-rear direction; the linkage plate is further provided with third via holes; a rear end of each of the third via holes is provided with a slider portion protruding forward; and the positioning block runs through the third via hole, and the slider portion is slidably arranged in the guide groove so as to provide a guide function for the linkage plate to move forward and rearward.

18. The mounting structure according to claim 1, wherein the blower assembly comprises a blower casing, an impeller mounted in the blower casing, and a blower motor mounted at a bottom side of the blower casing; a power output shaft of the blower motor is mounted with the impeller; the blower casing further has a blower flow channel therein, and the blower flow channel forms the blower air inlet at a lower side of a front end surface of the blower casing and forms the blower air outlet at an upper side of the front end surface of the blower casing; and the blower air inlet and the blower air outlet are located in a same plane, such that when the reversing block moves up and down, the reversing flow channel in the reversing block is butted with the blower air inlet or the blower air outlet.

19. The mounting structure according to claim 1, wherein the reversing block comprises a reversing block body, and the reversing flow channel of the reversing block body has a large front opening and a small rear opening; the rear opening of the reversing flow channel is the same size as the blower air inlet and the blower air outlet; the front opening of the reversing flow channel keeps corresponding to the first air port in upward and downward strokes of the reversing block; a top side of the reversing block body is further provided with a press platform configured to cooperate with the button rod of the deflation button, such that the reversing block moves downward when receiving a pressing force of the deflation button, thereby realizing switching from inflation to deflation; and a reversing block return spring is further arranged between a bottom side of the reversing block and a bottom side of the pump casing, such that the reversing block returns to its initial position when losing the pressing force of the deflation button, thereby realizing switching from deflation to inflation.

20. The mounting structure according to claim 1, wherein a power board is further arranged in the pump casing, the power board is connected with a power cord, and an upper position of the pump casing is further provided with a power cord via a hole for the power cord to run through.

* * * * *